(12) United States Patent
Moyer

(10) Patent No.: US 9,292,226 B2
(45) Date of Patent: Mar. 22, 2016

(54) ADAPTIVE DATA MANAGEMENT USING VOLUME TYPES

(71) Applicant: Steven Andrew Moyer, Round Rock, TX (US)

(72) Inventor: Steven Andrew Moyer, Round Rock, TX (US)

( * ) Notice: Subject to any disclaimer, the term of this patent is extended or adjusted under 35 U.S.C. 154(b) by 304 days.

(21) Appl. No.: 13/924,671

(22) Filed: Jun. 24, 2013

(65) Prior Publication Data

US 2014/0380014 A1    Dec. 25, 2014

(51) Int. Cl.
*G06F 3/06*    (2006.01)

(52) U.S. Cl.
CPC .............. *G06F 3/067* (2013.01); *G06F 3/0607* (2013.01); *G06F 3/0632* (2013.01)

(58) Field of Classification Search
CPC ..... G06F 3/067; G06F 3/0632; G06F 3/0607; G06F 17/303; G06F 17/30306; G06F 3/0605; G06F 3/065; G06F 3/0619; G06F 3/0683; G06F 11/2094; G06F 3/0614; G06F 3/0629; G06F 3/0647; G06F 3/0665; G06F 3/0685; G06F 11/1448; G06F 11/1458; G06F 11/1461; G06F 17/3056

See application file for complete search history.

(56) References Cited

U.S. PATENT DOCUMENTS

| | | | |
|---|---|---|---|
| 2006/0047930 A1* | 3/2006 | Takahashi | G06F 3/0605 711/162 |
| 2008/0208926 A1 | 8/2008 | Smoot et al. | |
| 2009/0240910 A1* | 9/2009 | Inomata | G06F 3/0605 711/171 |
| 2011/0040935 A1* | 2/2011 | Murayama | G06F 3/0605 711/114 |
| 2012/0151492 A1* | 6/2012 | Ripberger | G06F 3/0605 718/104 |

* cited by examiner

*Primary Examiner* — Zhuo Li
(74) *Attorney, Agent, or Firm* — Pierson IP, PLLC

(57) ABSTRACT

Systems and methods described herein utilize volume types to manage volumes within a data storage system. In embodiments, a volume type may be used to categorize a volume. The volume type may define attributes including data management policies associated with the management of volumes within the data storage system.

18 Claims, 12 Drawing Sheets

LocVectorAbsFromIncRandom
410 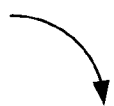

> START
>
> INPUT incomplete location vector incvector
>
> SET AllAbsVectors to the set of all possible absolute location vectors for data storage system 100 as determined from the topology definition record
>
> SET tempvector to incvector
>
> IF any element of AllAbsVectors is equivalent to tempvector THEN GOTO Done
>
> SET tempvector(3) to ANY
>
> IF any element of AllAbsVectors is equivalent to tempvector THEN GOTO Done
>
> SET tempvector(4) to ANY
>
> IF any element of AllAbsVectors is equivalent to tempvector THEN GOTO Done
>
> SET tempvector(5) to ANY
>
> IF any element of AllAbsVectors is equivalent to tempvector THEN GOTO Done
>
> SET tempvector(2) to ANY
>
> IF any element of AllAbsVectors is equivalent to tempvector THEN GOTO Done
>
> SET tempvector(1) to ANY
>
> Done:
>
> SET resultvector to a randomly selected element of AllAbsVectors that is equivalent to tempvector
>
> OUTPUT resultvector
>
> END

FIGURE 4A

LocVectorAbsFromRelRandom
420

FIGURE 4B

START

INPUT relative location vector relvector and anchor ancvector

SET AllAbsVectors to the set of all possible absolute location vectors for data storage system 100 as determined from the topology definition record SET tempvector to relvector IF any element of AllAbsVectors is equivalent to tempvector with respect to ancvector THEN GOTO Done SET tempvector(3) to ANY IF any element of AllAbsVectors is equivalent to tempvector with respect to ancvector THEN GOTO Done SET tempvector(4) to ANY IF any element of AllAbsVectors is equivalent to tempvector with respect to ancvector THEN GOTO Done SET tempvector(5) to ANY IF any element of AllAbsVectors is equivalent to tempvector with respect to ancvector THEN GOTO Done SET tempvector(2) to ANY IF any element of AllAbsVectors is equivalent to tempvector with respect to ancvector THEN GOTO Done SET tempvector(1) to ANY Done:

SET resultvector to a randomly selected element of AllAbsVectors that is equivalent to tempvector with respect to ancvector OUTPUT resultvector

END

Vcopy Table 510 

| VLID | VCID | Location |
|---|---|---|
| 750 | 750 | (Site 140, Sub-site 142, High Performance, File server 170, Failure domain 172-1) |
| 781 | 750 | (Site 140, Sub-site 142, High Performance, File server 170, Failure domain 172-1) |
| 782 | 750 | (Site 140, Sub-site 142, High Performance, File server 170, Failure domain 172-1) |
| 783 | 750 | (Site 140, Sub-site 141, Low Performance, File server 160, Failure domain 162-2) |
| 784 | 750 | (Site 110, Sub-site 111, Medium Performance, File server 120, Failure domain 122-1) |
| 785 | 750 | (Site 110, Sub-site 111, Medium Performance, File server 120, Failure domain 122-2) |
| 786 | 750 | (Site 140, Sub-site 142, High Performance, File server 170, Failure domain 172-1) |
| 787 | 750 | (Site 140, Sub-site 142, High Performance, File server 170, Failure domain 172-1) |

OpExec Table 520 

| VLID | OPID | ExecTime | Sources | Targets | Result |
|---|---|---|---|---|---|
| 750 | 742 | 01/01/2000 at 1:00 AM | 750 | 781 | Success |
| 750 | 742 | 01/01/2000 at 2:00 AM | 750 | 782 | Success |
| 750 | 743 | 01/01/2000 at 2:01 AM | 750 | 783 | Success |
| 750 | 744 | 01/01/2000 at 2:02 AM | 783 | 784 | Success |
| 750 | 745 | 01/01/2000 at 2:03 AM | 750 | 785 | Success |
| 750 | 742 | 01/01/2000 at 3:00 AM | 750 | 786 | Success |
| 750 | 742 | 01/01/2000 at 4:00 AM | 750 | 787 | Success |
| 750 | 745 | 01/01/2000 at 4:01 AM | 750 | 785 | Success |

FIGURE 5

VolIdentity 610

```
START

OUTPUT PEMGlobalVLID

END
```

CreateVolIncompleteLoc 620

```
START

INPUT incomplete location vector incvector

SET volLocation to output of CALL LocVectorAbsFromIncRandom 410 (incvector)

INSERT new row VcopyRowNew in relation Vcopy table 510

SET VcopyRowNew(VLID) to VIMGlobalVLID

SET VcopyRowNew(VCID) to VIMGlobalVLID

SET VcopyRowNew(Location) to volLocation

OUTPUT VIMGlobalVLID

END
```

FIGURE 6A

NewCopySameLoc
630 

```
START

INPUT volume UUID volID

SET copyID to a newly generated UUID

SELECT existing row VcopyRowExisting in relation Vcopy table 510 such that
VcopyRowExisting(VLID) equals volID INSERT new row VcopyRowNew in relation Vcopy table 510

SET VcopyRowNew(VLID) to copyID

SET VcopyRowNew(VCID) to volID

SET VcopyRowNew(Location) to VcopyRowExisting(Location)

OUTPUT copyID

END
```

FIGURE 6B

UpdateCopyRelativeLoc 640

```
START

INPUT volume UUID dmPolicyVolID
INPUT data management operation UUID dmPolicyOpID
INPUT relative location vector relvector
INPUT volume UUID volID SET copyID to output of CALL MostRecentTargets 650 (dmPolicyVolID,
dmPolicyOpID)

IF copyID is not equal to NULL THEN GOTO Done

SET copyID to a newly generated UUID

SELECT existing row VcopyRowExisting in relation Vcopy table 510 such that
VcopyRowExisting(VLID) equals volID SET copyLocation to output of CALL LocVectorAbsFromRelRandom 420
(relvector, VcopyRowExisting(Location))

INSERT new row VcopyRowNew in relation Vcopy table 510

SET VcopyRowNew(VLID) to copyID

SET VcopyRowNew(VCID) to volID

SET VcopyRowNew(Location) to copyLocation

Done

OUTPUT copyID

END
```

FIGURE 6C

MostRecentTargets 650

```
START

INPUT volume UUID dmPolicyVolID
INPUT data management operation UUID dmPolicyOpID SET targets to NULL IF there is no existing row OpExecRow in relation OpExec table 520 such that
OpExecRow(VLID) equals dmPolicyVolID and OpExecRow(OPID) equals
dmPolicyOpID THEN GOTO Done SELECT existing row OpExecRow in relation OpExec table 520 such that
OpExecRow(VLID) equals dmPolicyVolID and OpExecRow(OPID) equals
dmPolicyOpID and OpExecRow(ExecTime) is the most recent timestamp for any
such row SET targets to OpExecRow(Targets)

Done:

OUTPUT targets

END
```

FIGURE 6D

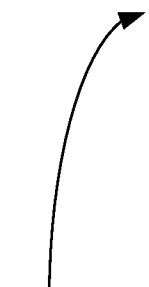

OpSpecType Table 710

| VTID | OPID | OpType | SourceProc | TargetProc | Trigger |
|---|---|---|---|---|---|
| 730 | 741 | Create | | CreateVolIncompleteLoc 620 ((Site 140, ANY, High Performance, ANY, ANY)) | |
| 730 | 742 | Snapshot | VolIdentity 610 | NewCopySameLoc 630 (VolIdentity 610) | Every 1 hour |
| 730 | 743 | Backup | VolIdentity 610 | UpdateCopyRelativeLoc 640 (VolIdentity 610, 743, (EQL, ANY, Low Performance, NEQ, ANY), VolIdentity 610) | Every day at 2AM |
| 730 | 744 | Replicate | MostRecentTargets 650 (VolIdentity 610, 743) | UpdateCopyRelativeLoc 640 (VolIdentity 610, 744, (NEQ, ANY, Low Performance, ANY, ANY), MostRecentTargets 650 (VolIdentity 610, 743)) | After applying operation 743 to this volume |
| 730 | 745 | Replicate | VolIdentity 610 | UpdateCopyRelativeLoc 640 (VolIdentity 610, 745, (NEQ, ANY, Medium Performance, ANY, ANY), VolIdentity 610) | Every 2 hours |

FIGURE 7A

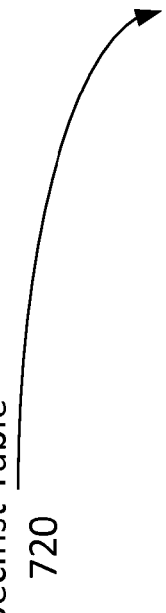

| VLID | OPID | OpType | SourceProc | TargetProc | Trigger |
|---|---|---|---|---|---|
| 750 | 742 | Snapshot | VolIdentity 610 | NewCopySameLoc 620 (VolIdentity 610) | Every 1 hour |
| 750 | 743 | Backup | VolIdentity 610 | UpdateCopyRelativeLoc 640 (VolIdentity 610, 743, (EQL, ANY, Low Performance, NEQ, ANY), VolIdentity 610) | Every day at 2AM |
| 750 | 744 | Replicate | MostRecentTargets 650 (VolIdentity 610, 743) | UpdateCopyRelativeLoc 640 (VolIdentity 610, 744, (NEQ, ANY, Low Performance, ANY, ANY), MostRecentTargets 650 (VolIdentity 610, 743)) | After applying operation 743 to this volume |
| 750 | 745 | Replicate | VolIdentity 610 | UpdateCopyRelativeLoc 640 (VolIdentity 610, 745, (NEQ, ANY, Medium Performance, ANY, ANY), VolIdentity 610) | Every 2 hours |

OpSpecInst Table 720

FIGURE 7B

ADAPTIVE DATA MANAGEMENT USING VOLUME TYPES

FIELD OF THE DISCLOSURE

The present disclosure relates generally to facilitating data management in a data storage system. In particular, embodiments described herein utilize volume types with data management policies for data management to manage volumes within a data storage system.

BACKGROUND

Conventional data storage systems are computer systems that store and retrieve data in response to actions performed on computing devices. Conventional data storage systems store data in volumes that are logical units of storage and that may be organized as hierarchical file systems. Volumes may include files, directories, and/or other storage objects (also referred to interchangeably as "storage objects" hereinafter).

Conventional data storage systems may perform data management operations to manage volumes and/or storage objects within the data storage system. However, in conventional data storage systems, an administrator must individually manage volumes and/or storage objects within the data storage system in accordance with data management policies to meet prescribed data management requirements.

Accordingly, as the number of volumes and/or storage objects within the data storage system increases or data management policies change, the administrator's management of the volumes and storage objects becomes more complex.

To this end, needs exist for efficient and effective systems and methods to manage volumes and storage objects within a data storage system in accordance with data management policies.

SUMMARY

In a data storage system, as data management policies change for volumes and/or storage objects, an administrator may identify each volume and/or storage object associated with a data management policy change and perform subsequent actions to implement the changed data management policy. A data storage system may become more complex if new storage servers or memory devices are introduced into the data storage system. In response to a new storage server being added to the data storage system, an administrator may identify each volume and/or storage object whose data management policies will change to include the new storage server and perform subsequent actions to implement the updated data management policies. A similar process may be implemented when decommissioning a storage server or memory device.

Embodiments described herein are configured to utilize volume types to perform data management operations to protect, retain, secure, control, monitor and/or govern a volume and/or storage objects in a volume. Examples of such data management operations include taking a snapshot, cloning, mirroring, backup, replication, migration, access control, quotas, quality of service (QoS), versioning, audit logging, and enforcing retention periods. In embodiments, a volume type may define attributes and/or data management policies for applying data management operations to volumes that are instances of the volume type (also referred to interchangeably as "volumes of the volume type" or "instances of the volume type" hereinafter).

In embodiments, a volume may be categorized as an instance of a volume type. The volume type may define attributes such as data management policies associated with how the volume, secondary copies of the volume, storage objects within the volume, and/or storage objects within secondary copies of the volume are managed and/or maintained within the data storage system.

Embodiments described herein are configured to receive instructions to define the attributes for a volume type. Attributes for a volume type may be implemented for volumes that are instances of the volume type located at storage servers and/or application servers. In embodiments, a volume may be created that is an instance of a specified volume type. In response to creating an instance of the volume type, attributes including the data management policies associated with the volume type may be implemented for the instance of the volume type. Hereinafter the attributes defined for a volume type, including the data management policies, may be interchangeably referred to as "volume type attributes" or "type attributes" and the attributes defined for an instance of a volume type, including the data management policies, may be interchangeably referred to as "volume instance attributes" or "instance attributes". Hereinafter modifying the values of, adding attributes to, and/or removing attributes from volume type attributes or volume instance attributes may be interchangeably referred to as "modifying" or "updating" the volume type attributes or the volume instance attributes.

The data management policies for volumes of a volume type may be uniformly managed and/or modified. Embodiments may be configured to enable data management policies to be updated for a volume type. In response to receiving instructions to update a data management policy or other attribute for a volume type, an embodiment may transmit instructions to automatically implement the updated data management policy or other attribute for the volumes of the volume type located at various storage servers and/or application servers. Accordingly, data management policies and/or other attributes for volumes within a data storage system may be efficiently and effectively managed based on volume types.

In embodiments, a data storage system may receive instructions to update an attribute for an instance of a volume type independent of other instances of the volume type. Accordingly, the data management policies for the instance of the volume type may be managed independently of other instances of the volume type. The attributes for the instance of the volume type may also be modified independent of the attributes associated with the volume type.

In one embodiment, for example, a data storage system may receive instructions to define a financial data volume type. The financial data volume type may include data management policy attributes specifying how long storage objects are to be retained in accordance with regulations implemented by the U.S. Securities and Exchange Commission (SEC).

In embodiments, the data storage system may receive instructions to create a volume of a specified volume type that is associated with a storage server or application server. In response to creating the volume, the instance attributes for the created volume may be populated with the type attributes of the specified volume type. For example, if the system receives instructions to create a volume of the financial data volume type, the instance attributes of the created volume may be populated with the type attributes of the financial data volume type.

In embodiments, attributes for a second volume type may be based on attributes for a first volume type. For example, the attributes for a first volume type may be copied to determine the attributes for a second volume type. Then, the attributes for the second volume type may be modified independently of the attributes for the first volume type.

In embodiments, to associate a volume that is not an instance of a volume type (such as a volume on a storage server or application server initially created outside the present invention) with a volume type, thereby making the volume an instance of the volume type, the system may determine the volume type to associate in response to the name of the volume, a selected field, an input from an administrator, or any other selection mechanism and/or criteria.

In embodiments, a data storage system may restrict the creating, modifying, updating, deleting, adding, and/or editing of volume type attributes and/or volume instance attributes including data management policy attributes. In embodiments, authentication and authorization may be implemented to verify that an administrator is permitted to define attributes for a volume type, create a volume of a volume type, update volume instance attributes, and/or perform any other action related to volume types and/or volumes.

In embodiments, volume type attributes and/or volume instance attributes may be a function of the state of the data storage system. For example, a volume may have a volume instance attribute that identifies the current location of volume, which may change over time.

In embodiments, a data storage system may apply data management operations to volumes of volume types and/or secondary copies of volumes of volume types automatically within the system. For a volume of a volume type, the data management policy instance attributes may define details that are associated with applying data management operations to that volume and/or secondary copies of that volume to meet data management requirements. For example, a data storage system may receive instructions to create a volume of the financial data volume type. Without receiving further instructions, the data storage system may automatically apply data management operations to the created volume and/or secondary copies of the created volume in response to the data management policy instance attributes of the created volume, which in this example equal the data management policy type attributes of the financial data volume type. In response to receiving instructions to update or modify the data management policy instance attributes of the created volume, the data storage system may modify the data management operations applied to the created volume and/or secondary copies of the created volume.

These and other aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

FIGS. 4A-4B depict example embodiments of methods of determining absolute location vectors.

FIG. 5 depicts an example embodiment of a table including data storage system state information FIGS. 6A-6D depict example embodiments of methods of determining sources and targets.

FIGS. 7A-7B depict example embodiments of tables including data management policy attributes.

Figure 1:
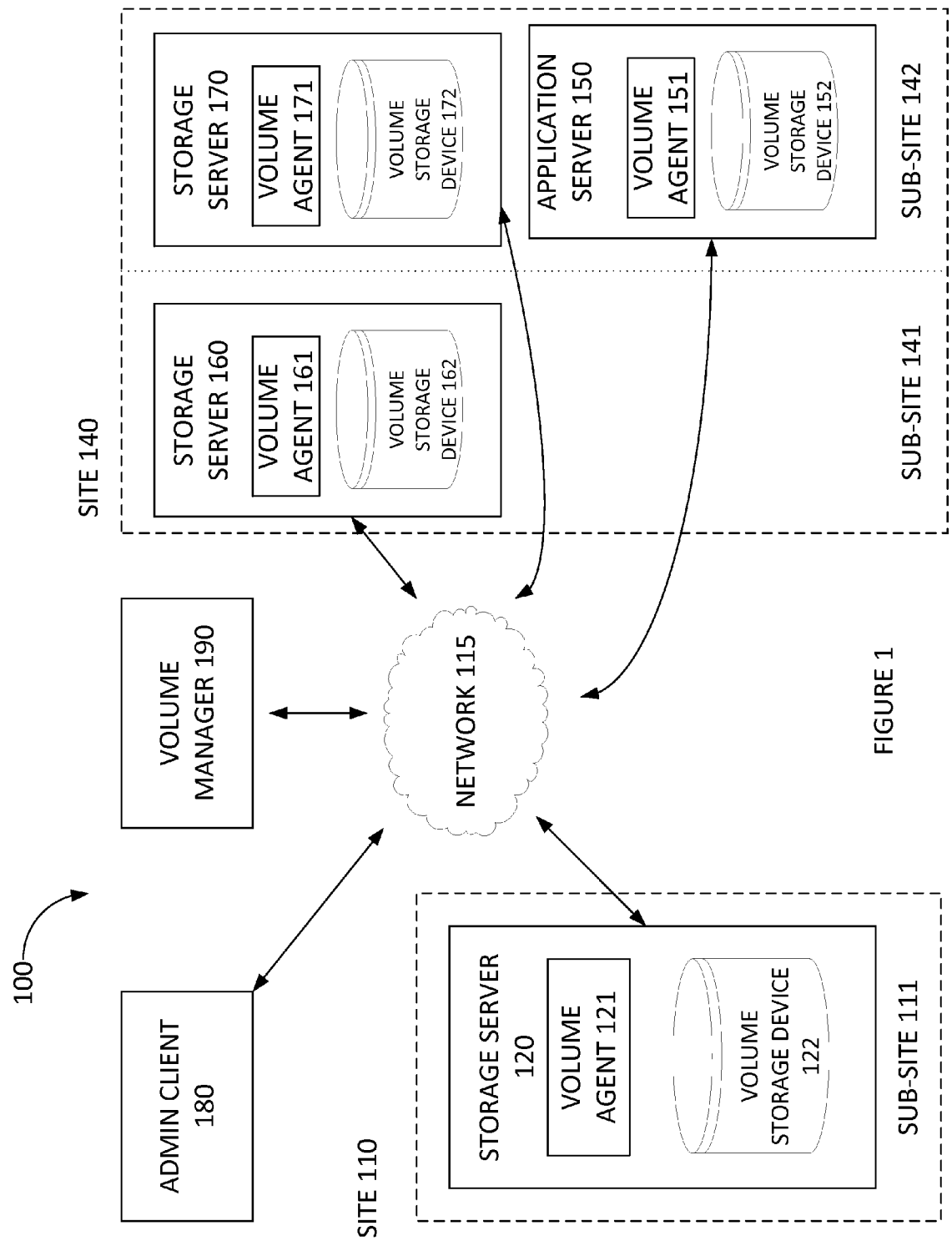
FIG. 1 depicts an example embodiment of a data storage system.

Corresponding reference characters indicate corresponding components throughout the several views of the drawings. It should be appreciated that elements in the figures are illustrated for simplicity and clarity and have not necessarily been drawn to scale. For example, the dimensions of some of the elements in the figures may be exaggerated relative to other elements to help improve understanding of various embodiments of the present disclosure. Further, common but well-understood elements that are useful or necessary in a commercially feasible embodiment are often not depicted in order to facilitate a less obstructed view of the various embodiments of the present disclosure.

DETAILED DESCRIPTION

In the following description, numerous and specific details are set forth in order to provide a thorough understanding of the present invention. It will be apparent, however, that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it should be appreciated that the figures provided herewith are for explanation purposes and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means for which implement the function/act specified in the flowchart and/or block diagram block or blocks.

FIG. 1 depicts a data storage system 100 according to one embodiment of the present invention. The data storage system 100 includes storage servers 120, 160, and 170, application server 150, volume manager 190, and admin client 180 that are configured to communicate with each other over network 115.

Data storage system 100 is also depicted with logical sites 110 and 140. Logical site 110 includes the single logical sub-site 111 including storage server 120. Logical site 140 includes logical sub-site 141, including storage server 160, and logical sub-site 142, including storage server 170 and application server 150. In an embodiment, logical sites and sub-sites represent a logical partitioning (or mapping) of the storage servers and/or application servers in a data storage system and may or may not correspond to physical entities such as information technology (IT) equipment racks, rooms, buildings, or other geographic locations. In embodiments, storage servers and application servers in a data storage system may be mapped or allocated to a logical site and a logical sub-site. In embodiments, volume manager 190 may allow an administrator to define logical sites, logical sub-sites, and/or a mapping of each storage server and/or application server to a logical site and a logical sub-site.

Network 115 may be a wired or wireless network such as a storage area network (SAN), the Internet, a Fibre Channel (FC) network, an intranet, an Ethernet LAN, SCSI, serial attached SCSI (SAS), a WAN, a cellular network or another type of network. It will be understood that network 115 may be a combination of multiple different kinds of wired or wireless networks. It will also be understood that network 115 may transmit multiple different storage networking and/or administrative protocols such as SCSI, iSCSI, SAS, FC, Fibre Channel over Ethernet (FCoE), Network File System (NFS), Server Message Block (SMB), Hypertext Transfer Protocol (HTTP), Cloud Data Management Interface (CDMI), Web Services Management (WS-MAN), Storage Management Initiative Specification (SMI-S), Telnet, and SSH.

Admin client 180 may be a desktop computer, smart phone, tablet computer, laptop computer, personal data assistant or any other type of client computing device with a hardware processor that is configured to process instructions and connect to network 115, one or more portions of network 115, volume manager 190, storage servers 120, 160, and 170, application server 150, and/or any other type of device that may assist data management within data storage system 100. In embodiments, admin client 180 may include an interface configured to receive commands from an administrator to perform administrative actions associated with volumes, secondary copies of volumes, storage objects within volumes, and/or storage objects within secondary copies of volumes within data storage system 100. Administrative actions may include defining, managing, and updating logical sites and sub-sites such as logical sites 110 and 140 and logical sub-sites 111, 141, and 142; defining volume types; updating attributes for volume types; creating volumes; updating volume instance attributes of volumes; performing operations on existing volumes and/or secondary copies of volumes; and obtaining state and status information for volumes and/or other elements of data storage system 100. In embodiments, admin client 180 may include a communication device configured to transmit instructions and/or responses to, and receive responses and/or instructions from, volume manager 190 in association with commands received from the administrator.

Volume manager 190 may be comprised of software and/or hardware computing devices such as processors and/or memory and may be configured to receive instructions and/or responses from, and transmit instructions and/or responses to, admin client 180, storage servers 120, 160, and 170, application server 150, volume agents 121, 161, 171, and 151, and/or any other type of device that may assist data management within data storage system 100. Volume manager 190 may transmit instructions to volume agents 121, 161, 171, and 151 to manage volumes on the respective elements. The transmitted instructions may be associated with creating volumes and/or secondary copies of volumes, updating volume instance attributes of volumes, performing operations on existing volumes and/or secondary copies of volumes, and obtaining state and status information for volumes and/or other aspects on the respective elements. In embodiments, volume manager 190 may be configured to receive instructions defining data management policies for a volume type, and may automatically transmit instructions to volume agents 121, 161, 171, and 151 to implement the data management policies for volumes and/or secondary copies of volumes of the volume type stored on storage servers 120, 160, and 170, and/or application server 150.

Storage servers 120, 160, and 170 may be computing devices such as general hardware servers executing software applications configured to store and retrieve data for client computing devices, such as admin client 180. Storage servers 120, 160, and 170 may include computer-readable media including one or more in any combination of an optical storage device, a magnetic storage device, storage disks, solid state drives (SDD), and magnetic tapes that may be organized, mapped, and/or virtualized using well-known techniques, such as RAID. Storage servers 120, 160, and 170 may each operate as a file server, a block server, or a combination. In embodiments, a storage server operating as a file server implements one or more file volumes that are each a logical unit of storage organized as a hierarchical file system including directories, files, and/or other storage objects that may be accessible over a network, such as network 115, using one or more file protocols such as NFS and SMB. In embodiments, a storage server operating as a block server implements one or more disk volumes that are each a logical unit of storage organized as a linear array of data blocks that may be accessible over a network, such as network 115, using one or more block protocols such as iSCSI, FC, FCoE, and SAS. In embodiments, a storage server may be configured to receive instructions from client computing devices, such as admin client 180, to store and retrieve storage objects in file volumes and/or data blocks in disk volumes. Hereinafter file volumes and disk volumes may be referred to as "volumes."

Storage servers 120, 160, and 170 may include or be associated with, and may implement volumes and/or secondary copies of volumes stored on, volume storage devices 122, 162, and 172, respectively. Volume storage devices 122, 162, 172 may include a combination of one or more of any type of storage device including an optical storage device, a magnetic storage device, storage disks, solid state drives (SDD), and magnetic tapes that may be organized, mapped, and/or virtualized using well-known techniques, such as RAID. Volume storage devices 122, 162, and 172 may be configured to store file volumes and/or disk volumes. Volume storage devices 122, 162, and 172 may also be configured to store attributes associated with the stored volumes including volume type attributes and/or volume instance attributes. In embodiments, storage servers 120, 160, and 170 may include a volume agent 121, 161, and 171, respectively. Volume agents 121, 161, and 171 may be comprised of software and/or hardware computing devices such as processors and/or memory and may be configured to receive and implement instructions from volume manager 190. The instructions received from volume manager 190 may be associated with volumes and/or secondary copies of volumes stored on volume storage devices 122, 162, 172 and/or 152.

Application server 150 may be a computing device such as a general hardware server comprised of hardware computing elements such as processors and/or memory devices. Application server 150 may be configured to execute one or more software applications (which may include operating systems) stored on the computing processors and/or memory devices. The software applications associated with application server 150 may be configured to receive, store, retrieve, transmit, create, map, delete and/or manage files, directories and/or other storage objects associated with volumes and/or secondary copies of volumes within data storage system 100. Application server 150 may include a volume agent 151. Application server 150 may include or be associated with, and may implement volumes stored on, volume storage device 152.

Volume agent 151 may be comprised of software and/or hardware computing devices such as processors and/or memory and may be configured to receive and implement instructions from volume manager 190. The instructions received from volume manager 190 may be associated with volumes and/or secondary copies of volumes stored on volume storage devices 152, 122, 162, and/or 172. Volume storage device 152 may include a combination of one or more of any type of storage device including an optical storage device, a magnetic storage device, storage disks, solid state drives (SDD), and magnetic tapes that may be organized, mapped, and/or virtualized using well-known techniques, such as RAID. Volume storage device 152 may be configured to store file volumes and/or disk volumes. Volume storage device 152 may also be configured to store attributes associated with the stored volumes including volume type attributes and/or volume instance attributes. In embodiments, application server 150 may implement and/or manage volumes stored on volume storage devices 152, 122, 162, and/or 172 including volumes mapped to one or more files in file volumes in accordance with well-known formats such as VMDK, VHD, VHDX, and QCOW2. In embodiments, application server 150 may implement and/or manage volumes stored on volume storage devices 122, 162, and/or 172 by communicating with storage servers 120, 160, and 170, respectively, over a network, such as network 115, using one or more file protocols and/or block protocols.

Volume Manager

Figure 2:
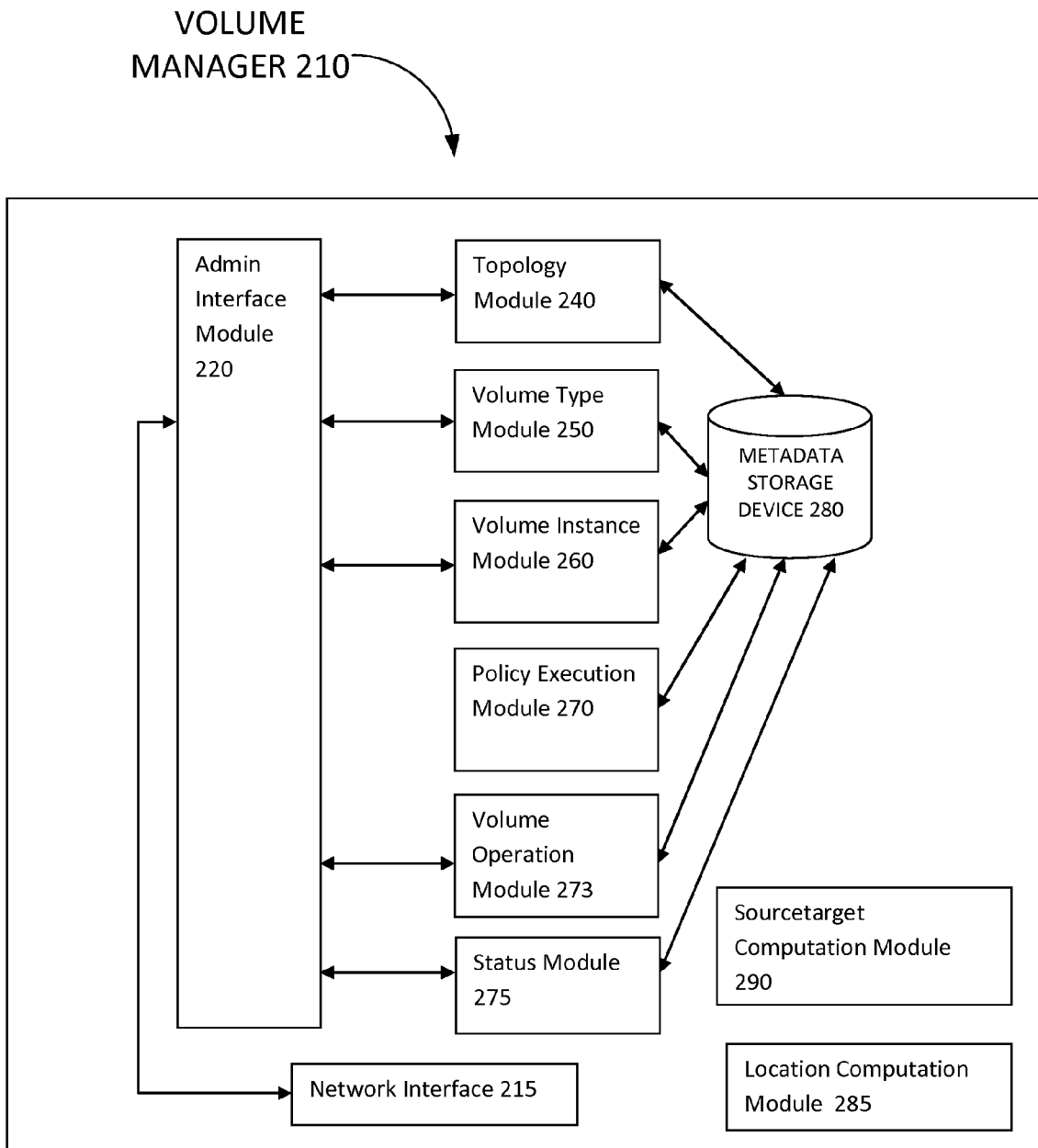
FIG. 2 depicts an example embodiment of components of a volume manager.

One embodiment of a volume manager, which may be the same or a similar volume manager as volume manager 190 depicted in FIG. 1, is depicted in FIG. 2. Referring to FIG. 2, volume manager 210 may include network interface 215, admin interface module 220, topology module 240, volume type module 250, volume instance module 260, policy execution module 270, volume operation module 273, status module 275, metadata storage device 280, location computation module 285, and/or sourcetarget computation module 290 that are configured to communicate with each other whether or not communication paths are depicted in FIG. 2.

Volume manager 210 may communicate with other components of a data storage system over a network through network interface 215. In embodiments, network interface 215 may be comprised of software and/or hardware computing devices such as processors and/or memory and may include one or more wireless transceivers for performing wireless communication and/or one or more communication ports for performing wired communication to connect volume manager 210 to a network and to transmit and/or receive the requisite storage networking protocols, file protocols, block protocols, and/or administrative protocols.

Admin interface module 220 may be comprised of software and/or hardware computing devices such as processors and/or memory and may be configured to use network interface 215 to transmit and/or receive data associated with logical sites and sub-sites, volume types, volume type attributes, volumes, volume instance attributes, file protocols, block protocols, storage networking protocols, and/or administrative protocols. In embodiments, admin interface module 220 may be configured to receive instructions from other elements, such as a client computing device, and transmit instructions to other elements, such as a volume agent on a storage server or application server. In embodiments, admin interface module 220 may be configured to receive instructions from, send output to, and/or otherwise interact with an administrator by presenting a graphical, text, touch, or speech based user interface using directly connected devices such as a computer screen, a touch screen, a physical keyboard, a mouse, a microphone, and/or a speaker. In embodiments, admin interface module 220 may be configured to receive instructions from, send output to, and/or otherwise interact with an administrator using a client computing device by communicating and presenting a Web browser user interface using Web-based technologies such as HTTP, HTML, and Ajax; a command line user interface (CLI) using text-based technologies such as Telnet and SSH; and/or a programmatic interface using administrative protocols such as Web Services Management (WS-MAN), Storage Management Initiative Specification (SMI-S), and/or Cloud Data Management Interface (CDMI). In embodiments, admin interface module 220 may be configured to use well-known authentication and authorization mechanisms to confirm that an administrator and/or client computing device is permitted to execute the received instructions and admin interface module 220 may generate an error response if permission is denied. In embodiments, admin interface module 220 may be configured to transmit some or all received instructions to an external element for verification and admin interface module 220 may generate an error response if verification fails. In embodiments, admin interface module 220 may be configured to direct received instructions to define and/or update logical sites and/or sub-sites to topology module 240, instructions to define and/or update volume types to volume type module 250, instructions to create volumes and/or update attributes of existing volumes to volume instance module 260, instructions to perform operations on volumes and/or secondary copies of volumes to volume operation module 273, and/or instructions to obtain state and status information to status module 275. In embodiments, admin interface module 220 may be configured to allow topology module 240, volume type module 250, volume instance module 260, volume operation module 273, and/or status module 275 to communicate over the network and to send output to and/or otherwise interact with an administrator using the directly connected devices and/or the client computing device. In embodiments, admin interface module 220 may be configured to respond with the results of executing the received instructions at topology module 240, volume type module 250, volume instance module 260, volume operation module 273, and/or status module 275. In embodiments, admin interface module 220 may be configured to transmit copies of some or all responses to authenticating, authorizing, verifying, and/or executing received instructions to an external element for logging and/or subsequent analysis.

Topology module 240 may be comprised of software and/or hardware computing devices such as processors and/or memory and may be configured to process received instructions that specify, and/or direct topology module 240 to generate some or all of, the initial logical sites and sub-sites for a data storage system. In embodiments, topology module 240 may process received instructions that specify, or direct topology module 240 to generate some or all of, a mapping of each storage server and/or application server in the data storage system to a logical site and a logical sub-site (referred to as "server mappings" hereinafter). In embodiments, topology module 240 may use discovery protocols, such as Service Location Protocol (SLP) and Web Services Dynamic Discovery (WS-Discovery), to facilitate identifying storage servers and/or application servers in the data storage system to map to the logical sites and sub-sites. In embodiments, topology module 240 may send output to and/or otherwise interact with an administrator by way of admin interface module 220 to facilitate defining the initial logical sites, logical sub-sites, and/or server mappings for the data storage system. Topology module 240 may store a topology definition record including the logical sites, logical sub-sites, and/or server mappings for the data storage system in metadata storage device 280. Furthermore, additional details associated with information that topology module 240 may store in metadata storage device 280 when defining the topology for the data storage system are provided below with reference to adaptive data management.

In embodiments, topology module 240 may also be configured to process received instructions to update the existing logical sites, logical sub-sites, and/or server mappings for a data storage system. In embodiments, topology module 240 may send output to and/or otherwise interact with an administrator by way of admin interface module 220 to facilitate updating the logical sites, logical sub-sites, and/or server mappings for the data storage system. Topology module 240 may store any updates to the logical sites, logical sub-sites, and/or server mappings in the topology definition record for the data storage system in metadata storage device 280. Furthermore, additional details associated with information that topology module 240 may store in metadata storage device 280 when updating the topology for the data storage system are provided below with reference to adaptive data management. Topology module 240 may then examine all volume type definition records (defined below) in metadata storage device 280 to determine if any volume type definition records are impacted by updates to the topology definition record (for example a volume type definition record may include a data management policy attribute referencing a logical sub-site that was removed by updates to the topology definition record). For each volume type definition record impacted, topology module 240 may transmit instructions to update the volume type attributes for the volume type represented by that record to volume type module 250. Topology module 240 may subsequently examine all volume instance definition records (defined below) in metadata storage device 280 to determine if any volume instance definition records are impacted by updates to the topology definition record (for example a volume instance definition record may include a data management policy attribute referencing a logical sub-site that was removed by updates to the topology definition record). For each volume instance definition record impacted, topology module 240 may transmit instructions to update the volume instance attributes for the volume represented by that record to volume instance module 260.

Volume type module 250 may be comprised of software and/or hardware computing devices such as processors and/or memory and may be configured to process received instructions to define a new volume type that specify, and/or direct volume type module 250 to generate some or all of, the volume type attributes, including data management policies, for the new volume type. In embodiments, volume type module 250 may receive instructions to generate some or all of the volume type attributes for the new volume type by first copying the volume type attributes from a volume type definition record (defined below) in metadata storage device 280 corresponding to a previously defined volume type and then modifying those attributes as specified by the received instructions. In embodiments, volume type module 250 may send output to and/or otherwise interact with an administrator by way of admin interface module 220 to facilitate defining the volume type attributes for the new volume type, including allowing the administrator to first copy the volume type attributes from the volume type definition record (defined below) in metadata storage device 280 corresponding to a previously defined volume type and then modify those attributes as appropriate. In embodiments, volume type module 250 may receive instructions to generate a parent type identifier for the new volume type. The parent type identifier may correspond to a previously defined volume type. The parent type identifier may indicate that the new volume type is a child of the previously defined volume type referred to as the parent of the new volume type. In embodiments, volume type module 250 may receive instructions to generate a parent type identifier for the new volume type indicating that the new volume type has no parent. Volume type module 250 may store a volume type definition record including the volume type attributes and the parent type identifier for the new volume type in metadata storage device 280. Furthermore, additional details associated with information that volume type module 250 may store in metadata storage device 280 when creating the new volume type are provided below with reference to adaptive data management.

In embodiments, volume type module 250 may also be configured to process received instructions to update the volume type attributes for an existing volume type, including received instructions from topology module 240. In embodiments, volume type module 250 may send output to and/or otherwise interact with an administrator by way of admin interface module 220 to facilitate updating the volume type attributes for the volume type, and may indicate when updating the volume type attributes is a consequence of prior updates to a topology definition record. Volume type module 250 may store any updates to the volume type attributes in the volume type definition record for the volume type in metadata storage device 280. Furthermore, additional details associated with information that volume type module 250 may store in metadata storage device 280 when updating the volume type attributes are provided below with reference to adaptive data management. Volume type module 250 may also be configured to transmit instructions to volume instance module 260 to execute a volume instance reconciliation method whereby the updates to the volume type attributes for the volume type are applied to volumes of the volume type. Volume type module 250 may further be configured such that for each volume type definition record in metadata storage device 280 with a parent type identifier corresponding to the volume type, volume type module 250 may execute a volume type reconciliation method (defined below) with inputs that may include the volume type definition record for the child in metadata storage device 280, the volume type attributes for the volume type prior to the updates (referred to below as the old parent type attributes), and/or the volume type attributes for the volume type after the updates (referred to below as the new parent type attributes).

In embodiments, volume type module 250 may also be configured to process received instructions to update the parent type identifier for an existing volume type. In embodiments, volume type module 250 may send output to and/or otherwise interact with an administrator by way of admin interface module 220 to facilitate updating the parent type identifier for the volume type. Volume type module 250 may store updates to the parent type identifier in the volume type definition record for the volume type in metadata storage device 280. Volume type module 250 may further be configured such that if the updated parent type identifier indicates that the volume type is a child, volume type module 250 may execute a volume type reconciliation method (defined below) with inputs that may include the volume type definition record for the volume type in metadata storage device 280, the volume type attributes for the parent of the volume type prior to updating the parent type identifier as read from the corresponding volume type definition record in metadata storage device 280 (referred to below as the old parent type attributes), and/or the volume type attributes for the parent of the volume type after updating the parent type identifier as read from the corresponding volume type definition record in metadata storage device 280 (referred to below as the new parent type attributes). In embodiments, volume type module 250 may execute a volume type reconciliation method with the input for the old parent type attributes being empty (i.e., not specifying any volume type attributes) if the parent type identifier for the volume type indicated no parent prior to being updated.

In embodiments, volume type module 250 may be configured to store and/or execute any number of volume type reconciliation methods for updating the volume type attributes for a specified volume type. In embodiments, the inputs to a volume type reconciliation method may include the volume type definition record for the volume type in metadata storage device 280, the old parent type attributes, and/or the new parent type attributes as defined above. In embodiments, volume type module 250 may be configured to execute a particular volume type reconciliation method. In embodiments, volume type module 250 may be configured to send output to and/or otherwise interact with an administrator by way of admin interface module 220 to facilitate selecting a volume type reconciliation method to execute. The following are examples of volume type reconciliation methods that volume type module 250 may store and/or execute; furthermore, additional details associated with information that volume type module 250 may store in metadata storage device 280 when updating the volume type attributes for the volume type are provided further below with reference to adaptive data management:

"Apply-all-unconditionally" is a method that may include the following steps:
1. The new parent type attributes may replace the current volume type attributes in the volume type definition record for the volume type in metadata storage device 280.
2. Instructions may be transmitted to volume instance module 260 to execute a volume instance reconciliation method whereby the updates in step 1 are applied to volumes of the volume type.
3. For each volume type definition record in metadata storage device 280 with a parent type identifier corresponding to the volume type, a volume type reconciliation method may be executed with inputs that may include the volume type definition record for the child in metadata storage device 280, the volume type attributes for the volume type (parent) prior to the updates in step 1, and/or the volume type attributes for the volume type (parent) after the updates in step 1.

"Apply-all-if-unchanged" is a method that may include the following steps:
1. The new parent type attributes may replace the current volume type attributes in the volume type definition record for the volume type in metadata storage device 280 if the current volume type attributes are equivalent to the old parent type attributes.
2. If step 1 updated the volume type attributes for the volume type then instructions may be transmitted to volume instance module 260 to execute a volume instance reconciliation method whereby the updates in step 1 are applied to volumes of the volume type.
3. If step 1 updated the volume type attributes for the volume type then for each volume type definition record in metadata storage device 280 with a parent type identifier corresponding to the volume type, a volume type reconciliation method may be executed with inputs that may include the volume type definition record for the child in metadata storage device 280, the volume type attributes for the volume type (parent) prior to the updates in step 1, and/or the volume type attributes for the volume type (parent) after the updates in step 1.

"Apply-selectively" is a method that may include the following steps:
1. An individual attribute from the new parent type attributes may replace the corresponding attribute in the current volume type attributes in the volume type definition record for the volume type in metadata storage device 280 if the corresponding attribute in the current volume type attributes is equivalent to the corresponding attribute in the old parent type attributes.
2. If step 1 updated the volume type attributes for the volume type then instructions may be transmitted to volume instance module 260 to execute a volume instance reconciliation method whereby the updates in step 1 are applied to volumes of the volume type.
3. If step 1 updated the volume type attributes for the volume type then for each volume type definition record in metadata storage device 280 with a parent type identifier corresponding to the volume type, a volume type reconciliation method may be executed with inputs that may include the volume type definition record for the child in metadata storage device 280, the volume type attributes for the volume type (parent) prior to the updates in step 1, and/or the volume type attributes for the volume type (parent) after the updates in step 1.

Volume instance module 260 may be comprised of software and/or hardware computing devices such as processors and/or memory and may be configured to process received instructions to create a new volume that specify, and/or direct volume instance module 260 to generate some or all of, the volume type for the new volume and/or the volume instance attributes, including data management policies, for the new volume. In embodiments, volume instance module 260 may be configured to receive instructions to generate the volume type for the new volume by selecting a previously configured default volume type from the set of volume type definition records in metadata storage device 280. In embodiments, volume instance module 260 may be configured to receive instructions to generate the volume type for the new volume by sending output to and/or otherwise interacting with an administrator by way of admin interface module 220 to facilitate selecting the volume type from the set of volume type definition records in metadata storage device 280. In embodiments, volume instance module 260 may receive instructions to generate some or all of the volume instance attributes for the new volume by first copying the volume type attributes from the volume type definition record in metadata storage device 280 corresponding to the volume type for the new volume and then modifying those attributes as specified by the received instructions. In embodiments, volume instance module 260 may send output to and/or otherwise interact with an administrator by way of admin interface module 220 to facilitate defining the volume instance attributes for the new volume, including first copying the volume type attributes from the volume type definition record in metadata storage device 280 corresponding to the volume type for the new volume and then allowing the administrator to modify those attributes as appropriate. Volume instance module 260 may transmit instructions to create the new volume including the instance attributes to the volume agent on the storage server or application server specified in the received instructions, specified by the administrator, or generated by a target procedure in sourcetarget computation module 290. In an embodiment, volume instance module 260 may act as a proxy for the volume agent by sending output to and/or otherwise interacting with an administrator by way of admin interface module 220 to facilitate selecting the volume or directory in a volume when creating a managed volume (defined below) as instructed by the volume agent. Volume instance module 260 may store a volume instance definition record including the volume instance attributes for the new volume in metadata storage device 280. Furthermore, additional details associated with information that volume instance module 260 may store in metadata storage device 280 when creating the new volume, and on the definition and use of sourcetarget computation module 290, are provided below with reference to adaptive data management.

In embodiments, volume instance module 260 may also be configured to process received instructions to update the volume instance attributes for an existing volume, including received instructions from topology module 240. In embodiments, volume instance module 260 may send output to and/or otherwise interact with an administrator by way of admin interface module 220 to facilitate updating the volume instance attributes for the volume, and may indicate when updating the volume instance attributes is a consequence of prior updates to a topology definition record. Volume instance module 260 may store any updates to the volume instance attributes in the volume instance definition record for the volume in metadata storage device 280. Furthermore, additional details associated with information that volume instance module 260 may store in metadata storage device 280 when updating the volume instance attributes are provided below with reference to adaptive data management.

In embodiments, volume instance module 260 may also be configured to process received instructions to update the volume type for an existing volume. In embodiments, volume instance module 260 may be configured to receive instructions to generate the new volume type for the volume by selecting a previously configured default volume type from the set of volume type definition records in metadata storage device 280. In embodiments, volume instance module 260 may be configured to receive instructions to generate the new volume type for the volume by sending output to and/or otherwise interacting with an administrator by way of admin interface module 220 to facilitate selecting the new volume type from the set of volume type definition records in metadata storage device 280. In embodiments, volume instance module 260 may receive instructions to generate some or all of the new volume instance attributes for the volume by first copying the volume type attributes from the volume type definition record in metadata storage device 280 corresponding to the new volume type for the volume and then modifying those attributes as specified by the received instructions. In embodiments, volume instance module 260 may send output to and/or otherwise interact with an administrator by way of admin interface module 220 to facilitate defining the new volume instance attributes for the volume, including first copying the volume type attributes from the volume type definition record in metadata storage device 280 corresponding to the new volume type for the volume and then allowing the administrator to modify those attributes as appropriate. Volume instance module 260 may store any updates to the volume type and the volume instance attributes in the volume instance definition record for the volume in metadata storage device 280. Furthermore, additional details associated with information that volume instance module 260 may store in metadata storage device 280 when updating the volume type and/or the volume instance attributes are provided below with reference to adaptive data management.

In embodiments, volume instance module 260 may also be configured to process received instructions from volume type module 250 to execute a volume instance reconciliation method whereby updates to the volume type attributes for a volume type are applied to volumes of the volume type. In embodiments, the received instructions may specify the old volume type attributes (i.e., prior to the updates) and the new volume type attributes (i.e., after the updates). An embodiment of volume instance module 260 may be configured to store and/or execute any number of volume instance reconciliation methods. In embodiments, volume instance module 260 may be configured to execute a particular volume instance reconciliation method. In embodiments, volume instance module 260 may be configured to send output to and/or otherwise interact with an administrator by way of admin interface module 220 to facilitate selecting a volume instance reconciliation method to execute. The following are examples of volume instance reconciliation methods that volume instance module 260 may store and/or execute; furthermore, additional details associated with information that volume instance module 260 may store in metadata storage device 280 when updating volume instance attributes for volumes of the volume type are provided further below with reference to adaptive data management:

"Apply-all-to-all-unconditionally" is a method whereby the new volume type attributes may be applied to the volume instance attributes in the volume instance definition records for all volumes of the volume type in metadata storage device 280.

"Apply-all-to-all-unchanged" is a method whereby the new volume type attributes may be applied to the volume instance attributes in the volume instance definition records for all volumes of the volume type in metadata storage device 280 for which the current volume instance attributes are equivalent to the old volume type attributes.

"Apply-selectively-to-all" is a method whereby each individual attribute from the new volume type attributes may be applied to the volume instance attributes in the volume instance definition records for all volumes of the volume type in metadata storage device 280 for which the corresponding attribute in the current volume instance attributes is equivalent to the corresponding attribute in the old volume type attributes.

"Apply-all-to-all-unchanged-plus-manual-updates" is a method whereby first the "apply-all-to-all-unchanged" method is executed and then, for each volume of the volume type in metadata storage device 280 that was not updated by the "apply-all-to-all-unchanged" method, volume instance module 260 may send output to and/or otherwise interact with an administrator by way of admin interface module 220 to facilitate updating the volume instance attributes in the volume instance definition record for the volume in metadata storage device 280.

Policy execution module 270 may be comprised of software and/or hardware computing devices such as processors and/or memory and may be configured to automatically execute the data management operations specified by the data management policy attributes for all volumes represented by volume instance definition records in metadata storage device 280 following the steps set forth below with reference to adaptive data management. In embodiments, policy execution module 270 may store a policy execution definition record including the status information for each data management operation executed in metadata storage device 280. In embodiments, policy execution module 270 may update volume instance definition records in metadata storage device 280 in the course of executing data management operations to maintain the accuracy of those records. For example if policy execution module 270 executes a data management operation that creates a new secondary copy of a volume it may update the volume instance definition record for that volume in metadata storage device 280 to reflect the existence and location of the new secondary copy. In embodiments, policy execution module 270 may be configured to send output to an external element by way of admin interface module 220 in the course of executing data management operations for logging status and/or results that may be used for subsequent analysis.

Volume operation module 273 may be comprised of software and/or hardware computing devices such as processors and/or memory and may be configured to process received instructions to execute an operation on an existing volume and/or secondary copy of an existing volume including an operation commonly provided by well-known NAS and SAN devices such as delete, snapshot, replicate and migrate. In embodiments, volume operation module 273 may send output to and/or otherwise interact with an administrator by way of admin interface module 220 to facilitate performing the operation. Volume operation module 273 may transmit instructions to execute the operation to the volume agent on the appropriate storage server or application server as determined from the volume instance definition record for the volume in metadata store device 280. Volume operation module 273 may store an operation execution definition record including the results of the operation in metadata storage device 280. Furthermore, additional details associated with information that volume operation module 273 may store in metadata storage device 280 when executing the operation are provided below with reference to adaptive data management.

Status module 275 may be comprised of software and/or hardware computing devices such as processors and/or memory and may be configured to process received instructions to determine specified state and/or status information for a data storage system. In embodiments, the specified state or status information to determine may include topology definition records, volume type definition records, volume instance definition records, policy execution definition records, and/or operation execution definition records stored in metadata storage device 280 that meet specified criteria; for example all volume instance definition records for volumes of a specified volume type stored on a specified storage server, or all volume instance definition records for volumes of a specified volume type for which the volume instance attributes for the volume differ from the volume type attributes for the volume type. In embodiments, the specified state or status information to determine may include a list of all actions that volume manager 210 may take in response to receiving instructions to make specified updates to a specified topology definition record, volume type definition record, and/or volume instance definition record. In embodiments, the specified state or status information to determine may include a specified subset of the additional information stored in metadata storage device 280 described with reference to adaptive data management.

Location computation module 285 may be comprised of software and/or hardware computing devices such as processors and/or memory and may be configured to process received instructions to store and/or execute any number of procedures for computing absolute location vectors in a data storage system. Additional details on the definition and use of location computation module 285 are provided below with reference to adaptive data management.

Sourcetarget computation module 290 may be comprised of software and/or hardware computing devices such as processors and/or memory and may be configured to process received instructions to store and/or execute any number of procedures for computing the sources and/or targets of data management operations in a data storage system. Additional details on the definition and use of sourcetarget computation module 290 are provided below with reference to adaptive data management.

It is understood that FIG. 2 depicting volume manager 210 illustrates one non-limiting embodiment and that others are possible. In some embodiments, volume manager 210 may be implemented as a stand-alone software application executing on a single general hardware server. In other embodiments, volume manager 210 may be implemented as a distributed software application executing on a plurality of general hardware servers. In further embodiments any or all of the functions of volume manager 210 may be incorporated into one or more storage servers and/or application servers in a data storage system.

Volume Agents

Figure 3:
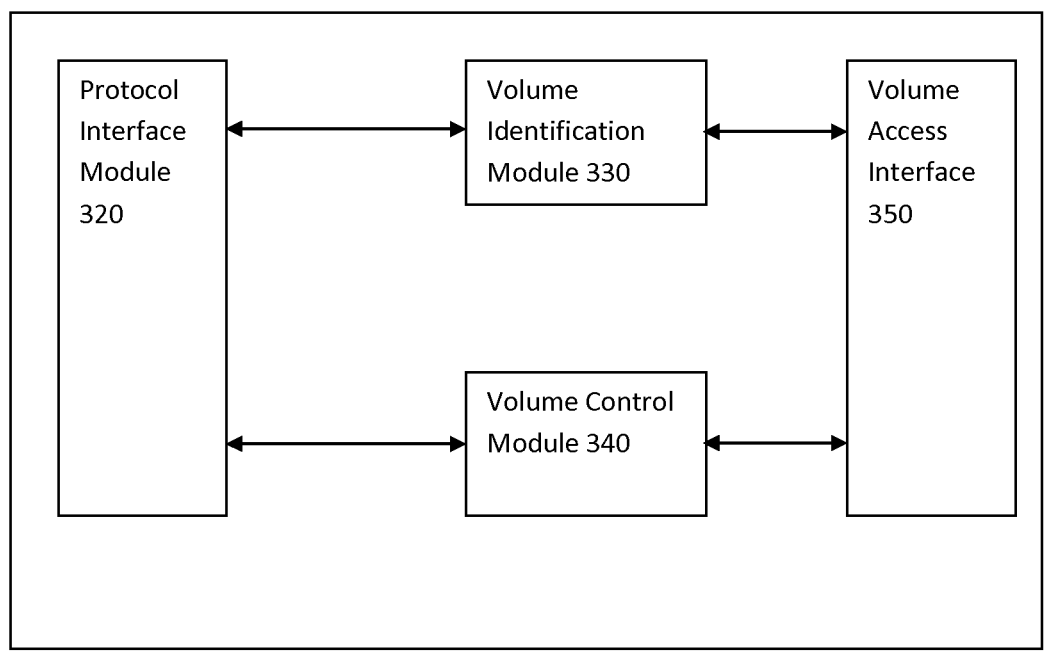
FIG. 3 depicts an example embodiment of components of a volume agent.

One embodiment of volume agents, which may be the same or similar as volume agents 121, 151, 161, and 171 as depicted in FIG. 1, is depicted as volume agent 310 in FIG. 3.

Referring to FIG. 3, volume agent 310 may include protocol interface module 320, volume identification module 330, volume control module 340, and/or volume access interface 350 that are configured to communicate with each other whether or not communication paths are depicted in FIG. 3. Volume agent 310 may be configured to receive instructions associated with a plurality of volumes comprised of volumes including a volume instance identifier, referred to as typed volumes, and volumes that do not include a volume instance identifier, referred to as untyped volumes. In an embodiment, typed volumes will be known to a volume manager and be associated with a volume instance definition record whereas untyped volumes will not be associated with a volume instance definition record.

Protocol interface module 320 may be comprised of software and/or hardware computing devices such as processors and/or memory and may be configured to use network interface software and/or hardware on the associated storage server or application server, and/or may include one or more wireless transceivers for performing wireless communication and/or one or more communication ports for performing wired communication, to communicate with other components of a data storage system over a network and to transmit and/or receive the requisite storage networking protocols, file protocols, block protocols, and/or administrative protocols. In embodiments, protocol interface module 320 may be configured to receive and/or transmit data associated with logical sites and sub-sites, volume types, volume type attributes, volumes, and/or volume instance attributes. In embodiments, protocol interface module 320 may be configured to receive instructions from and/or transmit instructions to other elements such as a volume manager. In embodiments, protocol interface module 320 may be configured to use well-known authentication and authorization mechanisms to confirm that a volume manager, administrator, and/or other element is permitted to execute the received instructions and protocol interface module 320 may generate an error response if permission is denied. In embodiments, protocol interface module 320 may be configured to transmit some or all received instructions to an external element for verification and protocol interface module 320 may generate an error response if verification fails. In embodiments, protocol interface module 320 may be configured to direct received instructions associated with creating new volumes to volume identification module 330 and/or instructions to execute operations on existing volumes and/or secondary copies of existing volumes to volume control module 340. In embodiments, protocol interface module 320 may be configured to allow volume identification module 330, volume control module 340, and/or volume access interface 350 to communicate over the network and to send instructions to a volume manager to in turn send output to and/or otherwise interact with an administrator. In embodiments, protocol interface module 320 may be configured to respond with the results of executing the received instructions at volume identification module 330 and/or volume control module 340. In embodiments, protocol interface module 320 may be configured to transmit copies of some or all responses to authenticating, authorizing, verifying, and/or executing received instructions to an external element for logging and/or subsequent analysis.

Volume identification module 330 may be comprised of software and/or hardware computing devices such as processors and/or memory and may be configured to process received instructions to create a new volume of the specified volume type. In embodiments, volume identification module 330 may be instructed to create a new empty volume that did not previously exist in the data storage system and may send instructions to volume access interface 350 to create the volume at the specified location on the specified volume storage device. In embodiments, volume identification module 330 may be instructed to create a new managed volume from the specified existing untyped volume on the specified volume storage device. In embodiments, volume identification module 330 may be instructed to create a new managed volume by sending output to and/or otherwise interacting with an administrator by way of protocol interface module 320 sending instructions to the volume manager that generated the received instructions to create the managed volume thereby allowing the administrator to select an existing untyped volume on a volume storage device. In embodiments, volume identification module 330 may allow the specified or selected untyped volume to be a directory in a file volume. In embodiments, volume identification module 330 may send instructions to volume access interface 350 to locate existing untyped volumes. In embodiments, volume identification module 330 may send instructions to volume access interface 350 to store a volume instance identifier and/or other volume instance attributes for the new volume in the new volume, in the associated volume storage device, and/or elsewhere in the data storage system.

Volume control module 340 may be comprised of software and/or hardware computing devices such as processors and/or memory and may be configured to process received instructions to execute an operation on an existing volume and/or secondary copy of an existing volume. In embodiments, volume control module 340 may send instructions to volume access interface 350 to execute the specified operation on the specified volume or secondary copy of a volume on the specified volume storage device.

Volume access interface 350 may be comprised of software and/or hardware computing devices such as processors and/or memory and may be configured to process received instructions to create, access, modify, delete, and/or perform other operations on volumes, secondary copies of volumes, and/or storage objects on storage servers, application servers, and/or volume storage devices. In embodiments, volume access interface 350 may be configured as an application programming interface (API). In embodiments, volume access interface 350 may be configured as a file protocol, block protocol, storage networking protocol, and/or an administrative protocol. In embodiments, volume access interface 350 may be configured to transmit and/or receive data associated with logical sites and sub-sites, volume types, volume type attributes, volumes, and/or volume instance attributes.

It is understood that FIG. 3 depicting volume agent 310 illustrates one non-limiting embodiment and that others are possible. It is also understood that different volume agents included in different storage servers and/or applications servers in a data storage system may have different embodiments. Furthermore in some embodiments any or all of the functions of volume agent 310 may be incorporated into one or more volume managers in a data storage system.

Adaptive Data Management

Herein a location discriminator is defined to be a particular aspect of the location of or for a volume or secondary copy of a volume in a data storage system. Examples of location discriminators may include:

Site: A specified logical site.
Sub-site: A specified logical sub-site.
Server class: A specified equivalence class of storage servers and/or application servers. For example the equivalence classes High Performance, Medium Performance, and Low Performance that are defined to form a partition of all storage servers and/or application servers in a data storage system.

Server: A specified storage server or application server.

Server failure domain: A specified failure domain within a specified storage server or application server. For example a specified RAID group comprising the volume storage device associated with a specified storage server or application server.

For data storage system 100 as depicted in FIG. 1, the valid values for the site, sub-site, and server location discriminators may be:

Site: site 110, site 140

Sub-site: sub-site 111, sub-site 141, sub-site 142

Server: storage server 120, storage server 160, storage server 170, application server 150

To support further examples herein, in an embodiment of data storage system 100 the valid values for the server class and server failure domain location discriminators may be defined as:

Server class:
High Performance class including storage server 170
Medium Performance class including storage server 120
Low Performance class including storage server 160 and application server 150

Server failure domain:
Failure domain 122-1 and failure domain 122-2 of volume storage device 122 including volumes and/or secondary copies of volumes associated with storage server 120
Failure domain 162-1, failure domain 162-2, and failure domain 162-3 of volume storage device 162 including volumes and/or secondary copies of volumes associated with storage server 160
Failure domain 172-1 and failure domain 172-2 of volume storage device 172 including volumes and/or secondary copies of volumes associated with storage server 170
Failure domain 152-1 of volume storage device 152 including volumes and/or secondary copies of volumes associated with application server 150

Those skilled in the art will recognize that an embodiment of topology module 240 may be extended in a straight-forward manner to process received instructions to define and/or update server classes, server failure domains, and/or other location discriminators associated with the topology of a data storage system and may store this information (along with the logical sites, logical sub-sites, and/or server mappings) in the topology definition record for the data storage system in metadata storage device 280.

Herein a location vector is defined to be an ordered n-tuple of location discriminators that specifies the location of or for a volume or secondary copy of a volume in a data storage system. To support further examples herein, in an embodiment of data storage system 100 location vectors may be defined as ordered 5-tuples of the form (site, sub-site, server class, server, server failure domain).

Herein the values of location discriminators in location vectors may be referred to using the notation lvector(k) where lvector is a given location vector, k is the position of a location discriminator in lvector and thus unambiguously identifies it, and k is a positive integer in the range 1 to n where n is the number of location discriminators in lvector. Applying this notation to a given location vector targetvector for data storage system 100, targetvector(1) refers to the value of the site location discriminator in targetvector and targetvector(5) refers to the value of the server failure domain location discriminator in targetvector.

For a given data storage system the value of a given location discriminator in a given location vector may be exactly one of the following:
A valid value for that location discriminator in the context of that data storage system. For example in data storage system 100 the two valid values for the site location discriminator are site 110 and site 140.
One of the unique and distinguished values ANY, EQL, NEQ discussed in detail below. Herein the value ANY is read as "any", EQL is read as "equal", and NEQ is read as "not equal".

For a given data storage system a given location vector lvector may be defined to be consistent if there exists in that data storage system a legitimate location for a volume or secondary copy of a volume described by location vector possiblevector where all location discriminators in possiblevector are valid values by definition and possiblevector(k) equals lvector(k) for all k such that lvector(k) is a valid value. A location vector is defined to be inconsistent if it is not consistent. For example in data storage system 100:
(site 140, sub-site 142, High Performance, storage server 170, failure domain 172-1) is consistent
(site 140, sub-site 142, Low Performance, storage server 170, failure domain 172-1) is inconsistent
(site 110, ANY, Medium Performance, ANY, ANY) is consistent
(site 110, ANY, Low Performance, ANY, ANY) is inconsistent An absolute location vector may be defined to be a consistent location vector in which no location discriminator has a value of ANY, EQL, or NEQ. An absolute location vector fully specifies the location of or for a volume or secondary copy of a volume. For example in data storage system 100 the location vector (site 140, sub-site 142, High Performance, storage server 170, failure domain 172-1) is an absolute location vector.

An incomplete location vector may be defined to be a consistent or inconsistent location vector in which one or more location discriminators has a value of ANY and no location discriminator has a value of EQL or NEQ. An incomplete location vector may partially specify the location of or for a volume or secondary copy of a volume where a location discriminator value of ANY is a placeholder for any valid value. Specifically, an absolute location vector absvector may be defined to be equivalent to an incomplete location vector incvector if absvector(k) equals incvector(k) for all k such that incvector(k) is a valid value.

A relative location vector may be defined to be a consistent or inconsistent location vector in which one or more location discriminators has a value of EQL or NEQ. A relative location vector may partially or fully specify the location of or for a volume or secondary copy of a volume with respect to another location vector referred to as an anchor where a discriminator value of EQL or NEQ is a placeholder for a valid value that is the same as or different from, respectively, the corresponding valid value in that anchor. Specifically, an absolute location vector absvector may be defined to be equivalent to a relative location vector relvector with respect to anchor ancvector if:
absvector(k) equals relvector(k) for all k such that relvector(k) is a valid value
absvector(k) equals ancvector(k) for all k such that relvector(k) equals EQL
absvector(k) does not equal ancvector(k) for any k such that relvector(k) equals NEQ In an embodiment, location computation module 285 may be configured to process received instructions to store and/or execute procedures for computing absolute location vectors for a data storage system. FIGS. 4A-4B depict examples of procedures that location computation module 285 may store and/or execute to compute absolute location vectors for data storage system 100. Summarizing the examples in FIGS. 4A-4B:

LocVectorAbsFromIncRandom 410 takes an incomplete location vector as an input and outputs a random absolute location vector that is equivalent to that incomplete location vector whenever possible.

LocVectorAbsFromRelRandom 420 takes a relative location vector and an anchor as inputs and outputs a random absolute location vector that is equivalent to that relative location vector with respect to that anchor whenever possible.

In an embodiment, volume manager 210 may store and/or maintain data storage system state information in metadata storage device 280 that includes:

Vcopy table 510 (FIG. 5) including information on every volume and/or secondary copy of a volume known to volume manager 210.

OpExec table 520 (FIG. 5) including information on every data management operation executed by policy execution module 270.

Vcopy table 510 as illustrated by example in FIG. 5 is a relation with one row for every volume and/or secondary copy of a volume known to volume manager 210. In this example embodiment, Vcopy table 510 depicts one volume and seven secondary copies of that volume known to volume manager 210 in data storage system 100. For a given row in Vcopy table 510 the column values may include VLID, VCID, and Location defined as:

VLID is the universally unique identifier (UUID) for the volume or secondary copy of a volume VCID
If VLID is a secondary copy of a volume then VCID is the UUID for the volume that VLID is a copy of
Otherwise if VLID is a volume then VCID has the same value as VLID Location is an absolute location vector specifying the current location of VLID OpExec table 520 as illustrated by example in FIG. 5 is a relation with one row for every data management operation executed by policy execution module 270. In this example embodiment, OpExec table 520 depicts eight data management operations executed by policy execution module 270 in data storage system 100. For a given row in OpExec table 520 the column values may include VLID, OPID, ExecTime, Sources, Targets, and Result defined as:

VLID is the UUID for the volume whose data management policy attributes policy execution module 270 was processing when it executed the data management operation and may correspond to a VLID from OpSpecInst table 720 (FIG. 7B) as discussed below OPID is the UUID for the data management operation executed and may correspond to an OPID from OpSpecInst table 720 (FIG. 7B) as discussed below ExecTime is a unique and distinguished timestamp for this execution of OPID Sources is the set of VLID from Vcopy table 510 that were sources for this execution of OPID Targets is the set of VLID from Vcopy table 510 that were targets for this execution of OPID Result is a status code from this execution of OPID (e.g., success or failure)

Herein the column values of a given row in a given relation (table) are referred to using the notation tablerow(colname) where tablerow is a specified row in the relation and colname is an identifier for a column in the relation. For example, if VcopyRow is a specified row in the relation Vcopy table 510 then VcopyRow(VLID) is the VLID column value in row VcopyRow.

Herein a source procedure is defined to be a procedure that takes a well-defined set of inputs and outputs a set of VLID from Vcopy table 510 that identifies the sources for a given data management operation. Similarly a target procedure is defined to be a procedure that takes a well-defined set of inputs and outputs a set of VLID from Vcopy table 510 that identifies the targets for a given data management operation. In an embodiment, a target procedure may enter new rows in Vcopy table 510 in the course of its operation if the given data management operation is to create new volumes and/or secondary copies of volumes. In an embodiment, a procedure may be used as both a source procedure and a target procedure.

In an embodiment, sourcetarget computation module 290 may be configured to process received instructions to store and/or execute procedures for computing the sources and/or targets of data management operations for a data storage system. FIGS. 6A-6D depict examples of procedures that sourcetarget computation module 290 may store and/or execute to compute sources and targets for data storage system 100. Summarizing the examples in FIGS. 6A-6D:

VolIdentity 610 is a source procedure and/or target procedure that outputs PEMGlobalVLID which is the UUID for the volume whose data management policy attributes policy execution module 270 is currently processing and may correspond to a single VLID from Vcopy table 510 as discussed below.

CreateVolIncompleteLoc 620 is a target procedure that takes an incomplete location vector as an input and outputs the single VLID from Vcopy table 510 from the new row it creates representing a new volume where the VLID column value is set to VIMGlobalVLID (which is the UUID for the volume that volume instance module 260 is currently creating) and where the Location column value is computed by sending instructions to location computation module 285 to execute the procedure ("calling") LocVectorAbsFromIncRandom 410.

NewCopySameLoc 630 is a target procedure that takes a VLID from Vcopy table 510 representing a volume as an input and outputs the single VLID from Vcopy table 510 from the new row it creates representing a secondary copy of the input volume where the Location column value is the same as that of the input volume.

UpdateCopyRelativeLoc 640 is a target procedure that takes a VLID and OPID from a row in OpSpecInst table 720 (discussed below), a relative location vector, and a VLID from Vcopy table 510 representing a volume as inputs and outputs either the set of VLID from Vcopy table 510 that were the targets of the most recent execution of OPID by policy execution module 270, as computed by executing the procedure ("calling") MostRecentTargets 650, or the single VLID from Vcopy table 510 from the new row it creates representing a secondary copy of the input volume where the Location column value is computed by sending instructions to location computation module 285 to execute the procedure ("calling") LocVectorAbsFromRelRandom 420.

MostRecentTargets 650 is a source procedure and/or target procedure that takes a VLID and OPID from a row in OpSpecInst table 720 (discussed below) as inputs and outputs either the set of VLID from Vcopy table 510 that were the targets of the most recent execution of OPID by policy execution module 270 or the unique and distinguished UUID value NULL.

In an embodiment, sourcetarget computation module 290 may be configured with any number of predefined source and/or target procedures and may be configured to process received instructions to store additional source and/or target procedures specified through admin interface module 220.

In an embodiment, volume type module 250 may store the following information in the volume type definition record for a volume type in metadata storage device 280 when processing received instructions to define a new volume type and/or update the volume type attributes for an existing volume type:

The UUID for the volume type as generated by volume type module 250 when defining the volume type.

The data management policy attributes for the volume type (which are a subset of the volume type attributes) stored in OpSpecType table 710 when defining the volume type and/or updating the volume type attributes for the volume type.

An example of OpSpecType table 710 is depicted in FIG. 7A as a relation with a set of rows for each volume type that collectively define the data management policy attributes for that volume type. In this example embodiment, OpSpecType table 710 depicts the data management policy attributes for a single volume type in data storage system 100 which includes five data management operations. Each row in OpSpecType table 710 may represent a data management operation associated with the data management policy attributes for a given volume type, and for a given row the column values may include VTID, OPID, OpType, SourceProc, TargetProc, and Trigger defined as:

VTID is the UUID for the volume type.

OPID is the UUID for this specific data management operation.

OpType is a unique and distinguished value for the category of this data management operation such as Create, Snapshot, Mirror, Backup, or Replicate. For a given VTID one row in OpSpecType table 710 has an OpType value of Create which specifies an operation to create a new volume of the volume type.

SourceProc is a reference to a source procedure stored in sourcetarget computation module 290 that outputs the sources for a given execution of this data management operation. SourceProc may include any arguments (inputs) to the referenced source procedure.

TargetProc is a reference to a target procedure stored in sourcetarget computation module 290 that outputs the targets for a given execution of this data management operation. TargetProc may include any arguments (inputs) to the referenced target procedure.

Trigger is a schedule or event, such as the execution of a specific data management operation, which defines when to execute this data management operation.

In an embodiment, volume instance module 260 may store the following information in the volume instance definition record for a volume in metadata storage device 280 when processing received instructions to create a new volume and/or update the volume instance attributes for an existing volume:

The UUID for the volume as generated by volume instance module 260 when creating the volume.

The UUID for the volume type as read from the volume type definition record by volume instance module 260 when creating the volume and/or updating the volume instance attributes for the volume.

The data management policy attributes for the volume (which are a subset of the volume instance attributes) stored in OpSpecInst table 720 when creating the volume and/or updating the volume instance attributes for the volume.

An example of OpSpecInst table 720 is depicted in FIG. 7B as a relation with a set of rows for each volume that collectively define the data management policy attributes for that volume. In this example embodiment, OpSpecInst table 720 depicts the data management policy attributes for a single volume in data storage system 100 which is an instance of the single volume type whose data management policy attributes are defined in OpSpecType table 710. Each row in OpSpecInst table 720 may represent a data management operation associated with the data management policy attributes for a given volume, and for a given row the column values may include VLID, OPID, OpType, SourceProc, TargetProc, and Trigger defined as:

VLID is the UUID for the volume and may also correspond to a VLID in Vcopy table 510.

OPID is the UUID for this specific data management operation.

OpType is a unique and distinguished value for the category of this data management operation such as Snapshot, Mirror, Backup, or Replicate. The OpType value may not be Create.

SourceProc is a reference to a source procedure stored in sourcetarget computation module 290 that outputs the sources for a given execution of this data management operation. SourceProc may include any arguments (inputs) to the referenced source procedure.

TargetProc is a reference to a target procedure stored in sourcetarget computation module 290 that outputs the targets for a given execution of this data management operation. TargetProc may include any arguments (inputs) to the referenced target procedure.

Trigger is a schedule or event, such as the execution of a specific data management operation, which defines when to execute this data management operation.

In an embodiment, volume instance module 260 may, when processing received instructions to create a new volume where the location for the volume is specified in the received instructions and/or by the administrator, enter a new row in Vcopy table 510 with column values VLID and VCID set to the UUID for the volume (as generated by volume instance module 260) and column value Location set to a value that reflects the specified location.

In an embodiment, volume instance module 260 may, when processing received instructions to create a new volume where no location is specified, set VIMGlobalVLID to the UUID for the volume (as generated by volume instance module 260) and transmit instructions to sourcetarget computation module 290 to execute the target procedure referenced by TargetProc in the row in OpSpecType table 710 where OpType equals Create and VTID is the UUID for the specified volume type as read from the volume type definition record for the volume type in metadata storage device 280, resulting in a new row in Vcopy table 510 where VLID equals VIMGlobalVLID. In an embodiment, volume instance module 260 may use the information in Location in the row in Vcopy table 510 where VLID equals VIMGlobalVLID to determine the volume agent to transmit instructions to for creating the new volume.

In embodiments, policy execution module 270 may be configured to monitor all Trigger column values in OpSpecInst table 720 and, when a Trigger value in a given row OpSpecInstRow indicates that the data management operation represented by OpSpecInstRow should be executed, policy execution module 270 may perform the following steps, which in other embodiments may be performed in various orders, steps may be removed, and/or additional steps may be added:

1. Set PEMGlobalVLID to OpSpecInstRow(VLID) which is the UUID for the volume whose data management policy attributes policy execution module 270 is currently processing. PEMGlobalVLID is available to be read by all procedures in sourcetarget computation module 290.
2. Transmit instructions to sourcetarget computation module 290 to execute the source procedure referenced by OpSpecInstRow(SourceProc) if defined and set CurrentSources to the output. Otherwise set CurrentSources to the unique and distinguished UUID value NULL.
3. Transmit instructions to sourcetarget computation module 290 to execute the target procedure referenced by OpSpecInstRow(TargetProc) if defined and set CurrentTargets to the output. Otherwise set CurrentTargets to the unique and distinguished UUID value NULL. The target procedure called, if any, may enter new rows in Vcopy table 510 if the data management operation to be executed is to create new secondary copies of volumes.
4. For every SrcUUID in CurrentSources that does not equal NULL transmit instructions to execute the operation OpSpecInstRow(OpType) to the volume agent on the storage server or application server specified by the Location column in the row in Vcopy table 510 where VLID equals SrcUUID.
5. For every TargetUUID in CurrentTargets that does not equal NULL transmit instructions to execute the operation OpSpecInstRow(OpType) to the volume agent on the storage server or application server specified by the Location column in the row in Vcopy table 510 where VLID equals TargetUUID.
6. Enter a row in OpExec table 520 with column values set as follows:
   VLID set to OpSpecInstRow(VLID)
   OPID set to OpSpecInstRow(OPID)
   ExecTime set to the current time
   Sources set to CurrentSources
   Targets set to CurrentTargets
   Result set to the result of executing the data management operations in steps 4 and 5.

In embodiments, volume operation module 273 may be configured to process received instructions to execute an operation on an existing volume and/or secondary copy of an existing volume and may also be configured to perform the following steps, which in other embodiments may be performed in various orders, steps may be removed, and/or additional steps may be added, to enter rows in Vcopy table 510 for each operation executed:

1. Set CurrentVolume to the UUID for the volume as read from the volume instance definition record for the volume in metadata storage device 280.
2. If executing the specified operation on the volume or secondary copy of the volume created new secondary copies of the volume then for each new secondary copy created enter a row in Vcopy table 510 with column values set as follows:

VLID set to a UUID generated by volume operation module 273 for the secondary copy
   VCID set to CurrentVolume
   Location set to a value that reflects the location of the secondary copy Below is an example embodiment of administrative actions that may be performed by an administrator of data storage system 100 and possible outcomes of those actions. It is to be noted that this example is for illustrative purposes and many details associated with the operation of data storage system 100, including those of the admin client, volume manager, volume agents, storage servers, application server, and/or other elements are omitted for clarity.

The administrator may specify the sites, sub-sites, server mappings, server classes and server failure domains for data storage system 100 as defined above. This administrative action may be carried out by topology module 240 which may store this information in a topology definition record in metadata storage device 280.

The administrator may then define a new volume type named "FinancialDataType" with data management policy attributes deemed appropriate to meet prescribed data management requirements for financial data. This administrative action may be carried out by volume type module 250 which may store a volume type definition record for "FinancialDataType" in metadata storage device 280. OpSpecType table 710 (FIG. 7A) depicts one embodiment of the data management policy attributes for the volume type "FinancialDataType" which is identified by the UUID value 730 and includes five data management operations.

The administrator may then create a new volume named "JohnDoeFinancialData" that is an instance of the volume type named "FinancialDataType" and has data management policy attributes equal to the data management policy attributes specified for "FinancialDataType". This administrative action may be carried out by volume instance module 260 which may store a volume instance definition record for "JohnDoeFinancialData" in metadata storage device 280. In the course of creating "JohnDoeFinancialData," volume instance module 260 may compute the location for the volume by setting VIMGlobalVLID to UUID 750 and then transmitting instructions to sourcetarget computation module 290 to execute the target procedure CreateVolIncompleteLoc 620 (FIG. 6A) with incomplete location vector (Site 140, ANY, High Performance, ANY, ANY) as input specifying that (when possible) volumes of this type be created on a storage server or application server in site Site 140 with a server class of High Performance. In this embodiment, CreateVolIncompleteLoc 620 may compute location (Site 140, Sub-site 142, High Performance, Storage server 170, Failure domain 172-1), which is equivalent to (Site 140, ANY, High Performance, ANY, ANY), may enter the row in Vcopy table 510 (FIG. 5) with column values VLID 750 and VCID 750 for the volume "JohnDoeFinancialData", and may output UUID 750. Volume instance module 260 may then set the data management policy attributes for volume "JohnDoeFinancialData" (with UUID 750) as depicted in OpSpecInst table 720 (FIG. 7B), which are equal to the data management policy attributes for volumes type "FinancialDataType" (with UUID 730) from OpSpecType table 710 minus the Create operation, and may continue with all other processing required to create the new volume "JohnDoeFinancialData" in the location specified by (Site 140, Sub-site 142, High Performance, Storage server 170, Failure domain 172-1).

With no further action from the administrator, policy execution module 270 may monitor the Trigger column values in OpSpecInst table 720 and may automatically apply data management operations as specified.

In an embodiment, the administrator creates volume "JohnDoeFinanacialData" on Jan. 1, 2000 at 12:00 AM. Below describes an example operation of policy execution module 270 with respect to that volume for a period of approximately four hours.

At 1:00 AM, policy execution module 270 may apply the Snapshot operation from OpSpecInst table 720 with column values VLID 750 and OPID 742 whose Trigger column value specifies this operation be applied every one hour. Policy execution module 270 may set PEMGlobalVLID to UUID 750 and may instruct sourcetarget computation module 290 to execute the source procedure VolIdentity 610 (FIG. 6A) which may output UUID 750 for volume "JohnDoeFinancialData". Policy execution module 270 may then instruct sourcetarget computation module 290 to execute the target procedure NewCopySameLoc 630 (FIG. 6B) with the volume UUID 750 as input (as again output by VolIdentity 610). In this embodiment, NewCopySameLoc 630 may compute location (Site 140, Sub-site 142, High Performance, Storage server 170, Failure domain 172-1), which is the same as that for volume "JohnDoeFinancialData" (with UUID 750), may enter the row in Vcopy table 510 with column values VLID 781 and VCID 750 for a new secondary copy of volume "JohnDoeFinancialData", and may output UUID 781. Policy execution module 270 may then apply the Snapshot operation with source UUID 750 and target UUID 781 and may enter the row in OpExec table 520 (FIG. 5) with column values VLID 750, OPID 742, and ExecTime Jan. 1, 2000 at 1:00 AM.

At 2:00 AM, policy execution module 270 may apply the Snapshot operation from OpSpecInst table 720 with column values VLID 750 and OPID 742 whose Trigger column value specifies this operation be applied every one hour. Policy execution module 270 may first set PEMGlobalVLID to UUID 750 and may then instruct sourcetarget computation module 290 to execute the source procedure VolIdentity 610 which may output UUID 750 for volume "JohnDoeFinancialData." Policy execution module 270 may then instruct sourcetarget computation module 290 to execute the target procedure NewCopySameLoc 630 with the volume UUID 750 as input (as again output by VolIdentity 610). In this embodiment, NewCopySameLoc 630 may compute location (Site 140, Sub-site 142, High Performance, Storage server 170, Failure domain 172-1), which is the same as that for volume "JohnDoeFinancialData" (with UUID 750), may enter the row in Vcopy table 510 with column values VLID 782 and VCID 750 for a new secondary copy of volume "JohnDoeFinancialData", and may output UUID 782. Policy execution module 270 may then apply the Snapshot operation with source UUID 750 and target UUID 782 and may enter the row in OpExec table 520 with column values VLID 750, OPID 742, and ExecTime Jan. 1, 2000 at 2:00 AM.

At 2:01 AM, policy execution module 270 may apply the Backup operation from OpSpecInst table 720 with column values VLID 750 and OPID 743 whose Trigger column value specifies this operation be applied every day at 2:00 AM. Policy execution module 270 may first set PEMGlobalVLID to UUID 750 and may then instruct sourcetarget computation module 290 to execute the source procedure VolIdentity 610 which may output UUID 750 for volume "JohnDoeFinancialData." Policy execution module 270 may then instruct sourcetarget computation module 290 to execute the target procedure UpdateCopyRelativeLoc 640 (FIG. 6C) with the volume UUID 750 (as again output by VolIdentity 610), operation UUID 743, relative location vector (EQL, ANY, Low Performance, NEQ, ANY), and volume UUID 750 (as again output by VolIdentity 610) as inputs. In this embodiment, UpdateCopyRelativeLoc 640 may compute location (Site 140, Sub-site 141, Low Performance, Storage server 160, Failure domain 162-2), which is equivalent to (EQL, ANY, Low Performance, NEQ, ANY) with respect to anchor (Site 140, Sub-site 142, High Performance, Storage server 170, Failure domain 172-1) which is the location of volume "JohnDoeFinancialData" (with UUID 750), may enter the row in Vcopy table 510 with column values VLID 783 and VCID 750 for a new secondary copy of volume "JohnDoeFinancialData", and may output UUID 783. Policy execution module 270 may then apply the Backup operation with source UUID 750 and target UUID 783 and may enter the row in OpExec table 520 with column values VLID 750, OPID 743, and ExecTime Jan. 1, 2000 at 2:01 AM.

At 2:02 AM policy execution module 270 may apply the Replicate operation from OpSpecInst table 720 with column values VLID 750 and OPID 744 whose Trigger column value specifies that this operation be applied after executing the Backup operation with column values VLID 750 and OPID 743. Policy execution module 270 may first set PEMGlobalVLID to UUID 750 and may then instruct sourcetarget computation module 290 to execute the source procedure MostRecentTargets 650 (FIG. 6D) with the volume UUID 750 (as output by VolIdentity 610) and operation UUID 743 as inputs. In this embodiment, MostRecentTargets 650 may output the UUID 783 representing the target of the preceding Backup operation. Policy execution module 270 may then instruct sourcetarget computation module 290 to execute the target procedure UpdateCopyRelativeLoc 640 with the volume UUID 750 (as again output by VolIdentity 610), operation UUID 744, relative location vector (NEQ, ANY, Low Performance, ANY, ANY), and secondary volume copy UUID 783 (as again output by MostRecentTargets 650 with inputs as previously described) as inputs. In this embodiment, UpdateCopyRelativeLoc 640 may compute location (Site 110, Sub-site 111, Medium Performance, Storage server 120, Failure domain 122-1), which is not equivalent to (NEQ, ANY, Low Performance, ANY, ANY) with respect to anchor (Site 140, Sub-site 141, Low Performance, Storage server 160, Failure domain 162-2) due to the mismatch in the server class location discriminator, may enter the row in Vcopy table 510 with column values VLID 784 and VCID 750 for a new secondary copy of volume "JohnDoeFinancialData", and may output UUID 784. Policy execution module 270 may then applies the Replicate operation with source UUID 783 and target UUID 784 and may enter the row in OpExec table 520 with column values VLID 750, OPID 744, and ExecTime Jan. 1, 2000 at 2:02 AM.

At 2:03 AM, policy execution module 270 may apply the Replicate operation from OpSpecInst table 720 with column values VLID 750 and OPID 745 whose Trigger column value specifies this operation be applied every two hours. Policy execution module 270 may first set PEMGlobalVLID to UUID 750 and may then instruct sourcetarget computation module 290 to execute the source procedure VolIdentity 610 which may output UUID 750 for volume "JohnDoeFinancialData." Policy execution module 270 may then instruct sourcetarget computation module 290 to execute the target procedure UpdateCopyRelativeLoc 640 with the volume UUID 750 (as again output by VolIdentity 610), operation UUID 745, relative location vector (NEQ, ANY, Medium Performance, ANY, ANY), and volume UUID 750 (as again output by VolIdentity 610) as inputs. In this embodiment, UpdateCopyRelativeLoc 640 may compute location (Site 110, Sub-site 111, Medium Performance, Storage server 120, Failure domain 122-2), which is equivalent to (NEQ, ANY, Medium Performance, ANY, ANY) with respect to anchor (Site 140, Sub-site 142, High Performance, Storage server 170, Failure domain 172-1) which is the location of volume "JohnDoeFinancialData" (with UUID 750), may enter the row in Vcopy table 510 with column values VLID 785 and VCID 750 for a new secondary copy of volume "JohnDoeFinancialData", and may output UUID 785. Policy execution module 270 may then apply the Replicate operation with source UUID 750 and target UUID 785 and may enter the row in OpExec table 520 with column values VLID 750, OPID 745, and ExecTime Jan. 1, 2000 at 2:03 AM.

At 3:00 AM, policy execution module 270 may apply the Snapshot operation from OpSpecInst table 720 with column values VLID 750 and OPID 742 whose Trigger column value specifies this operation be applied every one hour. Policy execution module 270 may first set PEMGlobalVLID to UUID 750 and may then instruct sourcetarget computation module 290 to execute the source procedure VolIdentity 610 which may output UUID 750 for volume "JohnDoeFinancialData." Policy execution module 270 may then instruct sourcetarget computation module 290 to execute the target procedure NewCopySameLoc 630 with the volume UUID 750 as input (as again output by VolIdentity 610). In this embodiment, NewCopySameLoc 630 may compute location (Site 140, Sub-site 142, High Performance, Storage server 170, Failure domain 172-1), which is the same as that for volume "JohnDoeFinancialData" (with UUID 750), may enter the row in Vcopy table 510 with column values VLID 786 and VCID 750 for a new secondary copy of volume "JohnDoeFinancialData", and may output UUID 786. Policy execution module 270 may then apply the Snapshot operation with source UUID 750 and target UUID 786 and may enter the row in OpExec table 520 with column values VLID 750, OPID 742, and ExecTime Jan. 1, 2000 at 3:00 AM.

At 4:00 AM, policy execution module 270 may apply the Snapshot operation from OpSpecInst table 720 with column values VLID 750 and OPID 742 whose Trigger column value specifies this operation be applied every one hour. Policy execution module 270 may first set PEMGlobalVLID to UUID 750 and may then instruct sourcetarget computation module 290 to execute the source procedure VolIdentity 610 which may output UUID 750 for volume "JohnDoeFinancialData." Policy execution module 270 may then instruct sourcetarget computation module 290 to execute the target procedure NewCopySameLoc 630 with the volume UUID 750 as input (as again output by VolIdentity 610). In this embodiment, NewCopySameLoc 630 may compute location (Site 140, Sub-site 142, High Performance, Storage server 170, Failure domain 172-1), which is the same as that for volume "JohnDoeFinancialData" (with UUID 750), may enter the row in Vcopy table 510 with column values VLID 787 and VCID 750 for a new secondary copy of volume "JohnDoeFinancialData", and may output UUID 787. Policy execution module 270 may then apply the Snapshot operation with source UUID 750 and target UUID 787 and may enter the row in OpExec table 520 with column values VLID 750, OPID 742, and ExecTime Jan. 1, 2000 at 4:00 AM.

At 4:01 AM, policy execution module 270 may apply the Replicate operation from OpSpecInst table 720 with column values VLID 750 and OPID 745 whose Trigger column value specifies this operation be applied every two hours. Policy execution module 270 may first set PEMGlobalVLID to UUID 750 and may then instruct sourcetarget computation module 290 to execute the source procedure VolIdentity 610 which may output UUID 750 for volume "JohnDoeFinancialData." Policy execution module 270 may then instruct sourcetarget computation module 290 to execute the target procedure UpdateCopyRelativeLoc 640 with the volume UUID 750 (as again output by VolIdentity 610), operation UUID 745, relative location vector (NEQ, ANY, Medium Performance, ANY, ANY), and volume UUID 750 (as again output by VolIdentity 610) as inputs. In this embodiment, UpdateCopyRelativeLoc 640 may determine that there exists a target previously created by this Replicate operation that should be updated, which is a secondary copy of volume "JohnDoeFinancialData" (with UUID 750), and may output that target UUID 785. Policy execution module 270 may then apply the Replicate operation with source UUID 750 and target UUID 785 and may enter the row in OpExec table 520 with column values VLID 750, OPID 745, and ExecTime Jan. 1, 2000 at 4:01 AM.

The above example illustrates how an embodiment of the present invention may address the complexities of data management in a data storage system. Accordingly, in embodiments the effort to successfully implement all data management policies is no longer proportional to the number of volumes in the data storage system since embodiments automatically implement the data management policies for each volume and/or secondary copy of a volume. Additionally, adapting to changes in data management requirements no longer requires manually identifying all volumes impacted and implementing updated data management policies for each since embodiments allow the administrator to update the data management policies for volume types and then automatically apply said updates to all volumes that are instances of those types. Additionally, adapting to changes in the configuration of a data storage system, such as the introduction of a new storage server, no longer requires manually identifying all volumes whose data management policies are or should be impacted and implementing updated data management policies for each since embodiments automatically adapt to such changes. It is to be noted that in the example above the data management policies for volume "JohnDoeFinancialData" do not identify specific storage servers or application servers for replicas of the volume, backups of the volume, or replicas of those backups but rather enables the volume manager to compute those locations dynamically as functions of data storage system state information. Additionally, migrating a volume to a different location no longer requires implementing updated data management policies for that volume since embodiments allow data management policies to be defined in a manner that avoids embedding details related to the storage server or application server associated with a volume.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A data storage system comprising:
a volume type module executed on a hardware processor configured to receive instructions over a network to define a first volume type for volumes stored within the data storage system, the first volume type defining volume type attributes including default values for data management policies for applying data management operations to the volumes or secondary copies of the volumes that are instances of the first volume type, the volumes stored within the data storage system being logical units of data; and a volume instance module executed on the hardware processor configured to receive instructions over the network to create a volume that is an instance of the first volume type and define volume instance attributes for the instance of the first volume type within the data storage system, the volume instance attributes including current values for data management policies for applying data management operations to the instance of the first volume type or secondary copies of the instance of the first volume type, wherein the volume instance attributes are based on the volume type attributes of the first volume type.

2. The system of claim 1, wherein the data management operations include at least one of taking a snapshot, cloning, mirroring, backup, replication, migration, access control, quotas, quality of service, versioning, audit logging, enforcing retention periods, and any other data management operation.

3. The system of claim 1, wherein the volume type module is further configured to receive instructions to define a second volume type, the second volume type defining second volume type attributes including data management policies for applying data management operations to second volumes or second secondary copies of the volumes that are instances of the second volume type, wherein the second volume type attributes are based on the volume type attributes of the first volume type and the second volume type attributes are managed independently from the volume type attributes of the first volume type.

4. The system of claim 1, wherein the volume type module is further configured to receive instructions to update the volume type attributes of the first volume type, wherein responsive to receiving the instructions to update the volume type attributes of the first volume type a volume instance reconciliation method is applied to the volume instance attributes of at least one instance of the first volume type.

5. The system of claim 1, wherein the volume instance module is further configured to receive instructions to update the volume instance attributes of the instance of the first volume type independently from the volume type attributes of the first volume type, and the volume instance module is configured to receive instructions to update the volume instance attributes of the instance of the first volume type independently from volume instance attributes of a second instance of the first volume type.

6. The system of claim 1, wherein the volume instance module is further configured to receive instructions to convert the instance of the first volume type to an instance of a second volume type and to update the volume instance attributes of the instance of the second volume type based on the volume type attributes of the second volume type.

7. The system of claim 1, wherein the volume type module is further configured to receive instructions to generate a parent type identifier for a second volume type, the parent type identifier being configured to indicate that the second volume type is a child of the first volume type and the first volume type is the parent of the second volume type, and wherein the volume type module is further configured to execute a volume type reconciliation method when updating the volume type attributes of a parent volume type, wherein the updates to the volume type attributes of the parent volume type are applied to the volume type attributes of at least one child of the parent volume type.

8. The system of claim 1, further comprising:

a topology module configured to receive instructions over the network to define a logical topology for the data storage system and to determine a mapping of at least one of a storage server and an application server within the data storage system to elements of the logical topology, and wherein the topology module is further configured to receive instructions to update the logical topology or the mapping of storage servers and applications servers to elements of the logical topology, to instruct the volume type module to update the volume type attributes of volume types responsive to the update to the logical topology or the mapping of storage servers and application servers to elements of the logical topology, and to instruct the volume instance module to update the volume instance attributes of instances of volume types responsive to the update to the logical topology or the mapping of storage servers and application servers to elements of the logical topology.

9. A data storage method comprising:

receiving instructions over a network to define a first volume type for volumes stored within a data storage system, the first volume type defining volume type attributes including default values for data management policies for applying data management operations to the volumes or secondary copies of the volumes that are instances of the first volume type, the volumes stored within the data storage system being logical units of data; and receiving instructions over the network to create a volume that is an instance of the first volume type and define volume instance attributes for the instance of the first volume type within the data storage system, the volume instance attributes including current values for data management policies for applying data management operations to the instance of the first volume type or secondary copies of the instance of the first volume type, wherein the volume instance attributes are based on the volume type attributes of the first volume type.

10. The method of claim 9, wherein the data management operations include at least one of taking a snapshot, cloning, mirroring, backup, replication, migration, access control, quotas, quality of service, versioning, audit logging, enforcing retention periods, and any other data management operation.

11. The method of claim 9, further comprising:

receiving instructions to define a second volume type, the second volume type defining second volume type attributes including data management policies for applying data management operations to second volumes or second secondary copies of the volumes that are instances of the second volume type, wherein the second volume type attributes are based on the volume type attributes of the first volume type and the second volume type attributes are managed independently from the volume type attributes of the first volume type.

12. The method of claim 9, further comprising:

receiving instructions to update the volume type attributes of the first volume type, wherein responsive to receiving the instructions to update the volume type attributes of the first volume type a volume instance reconciliation method is applied to the volume instance attributes of at least one instance of the first volume type.

13. The method of claim 9, further comprising:
receiving instructions to update the volume instance attributes of the instance of the first volume type independently from the volume type attributes of the first volume type; and
receiving instructions to update the volume instance attributes of the instance of the first volume type independently from volume instance attributes of a second instance of the first volume type.

14. The method of claim 9, further comprising:
receiving instructions to convert the instance of the first volume type to an instance of a second volume type and to update the volume instance attributes of the instance of the second volume type based on the volume type attributes of the second volume type.

15. The method of claim 9, further comprising:
receiving instructions to generate a parent type identifier for a second volume type, the parent type identifier being configured to indicate that the second volume type is a child of the first volume type and the first volume type is the parent of the second volume type; and
executing a volume type reconciliation method when updating the volume type attributes of a parent volume type, wherein the updates to the volume type attributes of the parent volume type are applied to the volume type attributes of at least one child of the parent volume type.

16. The method of claim 9, further comprising:
receiving instructions over the network to define a logical topology for the data storage system and to determine a mapping of at least one of a storage server and an application server within the data storage system to elements of the logical topology;
receiving instructions to update the logical topology or the mapping of storage servers and applications servers to elements of the logical topology;
updating the volume type attributes of volume types responsive to the update to the logical topology or the mapping of storage servers and application servers to elements of the logical topology; and
updating the volume instance attributes of instances of volume types responsive to the update to the logical topology or the mapping of storage servers and application servers to elements of the logical topology.

17. A data storage system comprising:
a volume type module executed on a processor configured to receive instructions over a network to define a first volume type for volumes stored within the data storage system, the first volume type defining volume type attributes including data management policies for applying data management operations to the volumes or secondary copies of the volumes that are instances of the first volume type; and
a volume instance module executed on the processor configured to receive instructions over the network to create an instance of the first volume type and define volume instance attributes for the instance of the first volume type within the data storage system, the volume instance attributes including data management policies for applying data management operations to the instance of the first volume type or secondary copies of the instance of the first volume type, wherein the volume instance attributes are based on the volume type attributes of the first volume type,
wherein the volume type module is further configured to receive instructions to generate a parent type identifier for a second volume type, the parent type identifier being configured to indicate that the second volume type is a child of the first volume type and the first volume type is the parent of the second volume type, and wherein the volume type module is further configured to execute a volume type reconciliation method when updating the volume type attributes of a parent volume type, wherein the updates to the volume type attributes of the parent volume type are applied to the volume type attributes of at least one child of the parent volume type.

18. A data storage method comprising:
receiving instructions over a network to define a first volume type for volumes stored within a data storage system, the first volume type defining volume type attributes including data management policies for applying data management operations to the volumes or secondary copies of the volumes that are instances of the first volume type;
receiving instructions over the network to create an instance of the first volume type and define volume instance attributes for the instance of the first volume type within the data storage system, the volume instance attributes including data management policies for applying data management operations to the instance of the first volume type or secondary copies of the instance of the first volume type, wherein the volume instance attributes are based on the volume type attributes of the first volume type;
receiving instructions to generate a parent type identifier for a second volume type, the parent type identifier being configured to indicate that the second volume type is a child of the first volume type and the first volume type is the parent of the second volume type; and
executing a volume type reconciliation method when updating the volume type attributes of a parent volume type, wherein the updates to the volume type attributes of the parent volume type are applied to the volume type attributes of at least one child of the parent volume type.

* * * * *